(12) United States Patent
Britti et al.

(10) Patent No.: US 8,631,242 B2
(45) Date of Patent: *Jan. 14, 2014

(54) APPLICANT SCREENING

(71) Applicant: TransUnion Rental Screening Solutions, Inc., Greenwood Village, CO (US)

(72) Inventors: Michael A. Britti, Lone Tree, CO (US); Michael Jon Mauseth, Bethesda, MD (US); Joel R. Springer, Englewood, CO (US); Robert D. Thornley, Denver, CO (US)

(73) Assignee: TransUnion Rental Screen Solutions, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/625,237

(22) Filed: Sep. 24, 2012

(65) Prior Publication Data

US 2013/0018811 A1 Jan. 17, 2013

Related U.S. Application Data

(63) Continuation of application No. 13/558,781, filed on Jul. 26, 2012, which is a continuation of application No. 11/189,024, filed on Jul. 25, 2005, now Pat. No. 8,234,498.

(51) Int. Cl.
*G06F 21/00* (2013.01)

(52) U.S. Cl.
USPC ............... 713/182; 713/184; 726/27; 726/28; 726/29

(58) Field of Classification Search
USPC ......................................................... 705/325
See application file for complete search history.

(56) References Cited

U.S. PATENT DOCUMENTS

| | | |
|---|---|---|
| 4,774,664 A | 9/1988 | Campbell et al. |
| 4,876,648 A | 10/1989 | Lloyd |
| 4,948,174 A | 8/1990 | Thomson et al. |
| 4,953,085 A | 8/1990 | Atkins |
| 5,214,579 A | 5/1993 | Wolfberg et al. |
| 5,274,547 A | 12/1993 | Zoffel et al. |
| 5,615,408 A | 3/1997 | Johnson et al. |
| 5,754,850 A | 5/1998 | Janssen |
| 5,844,817 A | 12/1998 | Lobley et al. |
| 5,995,947 A | 11/1999 | Fraser et al. |
| 6,029,149 A | 2/2000 | Dykstra et al. |

(Continued)

OTHER PUBLICATIONS

"Are You Blacklisted," ohmyapt.apartmentratings.com., Oct. 17, 2005, 15 pages.
"Bill Would Restrict Firms that Investigate Tenants," Newsday, Feb. 22, 1986, 4 pages.
"Company aims to ease rental problems for all," The Press Democrat, Aug. 19, 2000, 1 page.

(Continued)

*Primary Examiner* — Pramila Parthasarathy
(74) *Attorney, Agent, or Firm* — HolzerIPLaw, PC

(57) ABSTRACT

A system of screening servers, screener client computers, and screening kiosks distribute an applicant screening process among multiple sites and multiple participants. To facilitate and secure communications of screening results and applicant actions, a personal identification code is provided that identifies individual sets of screening results. In this manner, the applicant is authenticated and can then enter appropriate applicant profile data into a secure screening account, such as via a screening kiosk. Screening results may be generated for the applicant in association with a unique personal identification code. This code can then be communicated to the screener, who can access the screening results along with a recommendation, if desired, by sending the code to a screening server.

20 Claims, 26 Drawing Sheets

(56) References Cited

U.S. PATENT DOCUMENTS

| | | | |
|---|---|---|---|
| 6,044,352 A | 3/2000 | Deavers | |
| 6,049,784 A | 4/2000 | Weatherly et al. | |
| 6,088,686 A | 7/2000 | Walker et al. | |
| 6,119,103 A | 9/2000 | Basch et al. | |
| 6,128,602 A | 10/2000 | Northington et al. | |
| 6,154,729 A | 11/2000 | Cannon et al. | |
| 6,185,545 B1 | 2/2001 | Resnick et al. | |
| 6,236,973 B1 | 5/2001 | Dillard | |
| 6,311,169 B2 | 10/2001 | Duhon | |
| 6,850,901 B1 | 2/2005 | Hunter et al. | |
| 6,871,140 B1 | 3/2005 | Florance et al. | |
| 6,898,574 B1 | 5/2005 | Regan | |
| 6,945,457 B1 | 9/2005 | Barcelou | |
| 7,212,979 B1 | 5/2007 | Matz et al. | |
| 7,376,619 B1 | 5/2008 | Jones et al. | |
| 7,398,218 B1 | 7/2008 | Bernaski et al. | |
| 2001/0034700 A1 | 10/2001 | Foss et al. | |
| 2001/0037280 A1 | 11/2001 | Ingraham et al. | |
| 2002/0013906 A1 | 1/2002 | Wallach et al. | |
| 2002/0026411 A1 | 2/2002 | Nathans et al. | |
| 2002/0072927 A1 | 6/2002 | Phelan et al. | |
| 2002/0082962 A1 | 6/2002 | Farris et al. | |
| 2002/0147680 A1 | 10/2002 | Cho et al. | |
| 2002/0161606 A1 | 10/2002 | Bennett et al. | |
| 2002/0169641 A1 | 11/2002 | Wallace, Jr. | |
| 2002/0198819 A1 | 12/2002 | Munoz et al. | |
| 2003/0033261 A1 | 2/2003 | Knegendorf | |
| 2003/0093289 A1 | 5/2003 | Thornley et al. | |
| 2003/0187756 A1 | 10/2003 | Klivington et al. | |
| 2003/0204425 A1 | 10/2003 | Kennedy et al. | |
| 2003/0208362 A1 | 11/2003 | Enthoven et al. | |
| 2004/0030640 A1 | 2/2004 | Mahnken et al. | |
| 2004/0230636 A1 | 11/2004 | Masuoka et al. | |
| 2004/0243518 A1 | 12/2004 | Clifton et al. | |
| 2005/0071202 A1 | 3/2005 | Kendrick | |
| 2005/0144028 A1 | 6/2005 | Donahue et al. | |
| 2005/0177488 A1* | 8/2005 | Rexrode | 705/38 |

OTHER PUBLICATIONS

"Renters Beware," Wall Street Journal, Aug. 2, 2000, 3 pages.
"RentPort announced credit service," Real Estate Weekly, Sep. 13, 2000, 1 page.
Applicant Screening, Saferent Applicant Screening Website Archive 2001, Jul. 31, 2007, http://web.archive.org/web/2001020807622/www.saferent.com/services/content; 6 pages.
Final Office Action, U.S. Appl. No. 10/209,094, dated Apr. 27, 2010, 20 pages.
Interview Summary, U.S. Appl. No. 10/209,094, dated Sep. 20, 2010, 3 pages.
Mark Edward Facsimile Transmission from Rent Roll Inc., 2395 Midway Road, Carrollton, TX 75006, "Pages of Information to Andrew Lerner on how the Rent Roll Inc system works," Jan. 19, 1999, 6 pages.
Miscellaneous action from the US Patent and Trademark Office, U.S. Appl. No. 10/209,094, dated Dec. 31, 2007, 4 pages.
News and Events, Factual Data Website Archive 2000, printed Jul. 31, 2007, http://web.archive.org/web20000229152519/http://www.factualdata.com/; 1 page.
Non-final Office Action, U.S. Appl. No. 10/209,094, dated Apr. 5, 2007, 21 pages.
Non-final Office Action, U.S. Appl. No. 10/209,094, dated Sep. 21, 2009, 19 pages.
Patent Cooperation Treaty (PCT) International Search Report, (Form/PCT/ISA/210), US Patent and Trademark Office as International Search Authority, PCT Application No. PCT/US06/29022, Applicant: RentPort, Inc., 3 pages, Mar. 23, 2007.
On-Site.com—Smart screening & online leasing, http://www.on-site.com, 2 pages (c) 2001-2006, printed Oct. 27, 2006.
BlueMoon.com: Forms, solutions for your office or enterprise; http://www.bluemmon.com, 1 page, (c) 2002-2006, printed Oct. 27, 2006.
Vaultware.com: Making It Easy to Lease, http://www.vaultware.com, 1 page, (c) 2006, printed Oct. 27, 2006.
Tenant Reports, Factual Website Archive 2000m printed Jul. 13, 2007, http://web.archive.org/web/20000312022716/www.factualdata.com/tenant.htm; 2 pages.
Uncover What's Behind Happy Face, Far West Credit, Inc. Website Archive 2000, printed Jul. 13, 2007, http://web.archive.org/web/2001012035200/www.farwesr-credit.com/tnt_central.htm, 1 page.
Your Road to the Future, Far West Credit, Inc. Website Archive 2000, printed Jul. 13, 2007, http://web.archive.org/web/20001010032133/http://www.farwest-credit.com/; 1 page.
Credit Retreiver—Sales and Marketing Training Manual, Retriever Product Demo, Jan. 28, 2004, 6 pages.
Non-final office action, U.S. Appl. No. 11/490,616, dated Dec. 8, 2009, 10 pages.
Non-final office action, U.S. Appl. No. 11/490,616, dated Jul. 20, 2010, 10 pages.
Response and Amendment to Dec. 8, 2009 non-final office action, U.S. Appl. No. 11/490,616, dated Jun. 4, 2010, 9 pages.
Notice of non-compliant amendment dated Aug. 6, 2008, U.S. Appl. No. 10/209,094, 5 pages.
Notice of non-compliant amendment dated Jan. 22, 2009, U.S. Appl. No. 10/209,094, 4 pages.
Our Services, Resident Data's Website Archive 2002, http://web.archive.org/web/20021207082323/www.residentdata.com/Services.asp; 11 pages.
Product Sheet Tenant Screening, Far West Credit, Inc. Website Archive 2000, printed Jul. 13, 2007, thhp://web.archive.org/web/2001012609300/www.farwest-credit.com/tnt_products.htm; 1 page.
Response to Apr. 27, 2010, final office action, U.S. Appl. No. 10/209,094, dated Sep. 17, 2010, 18 pages.
Response to Apr. 5, 2007 non-final office action, U.S. Appl. No. 10/209,094, dated Oct. 5, 2007, 65 pages.
Response to Aug. 6, 2008 notice of non-compliant amendment, U.S. Appl. No. 10/209,094, dated Oct. 6, 2008, 5 pages.
Response to Dec. 31, 2007 miscellaneous action, U.S. Appl. No. 10/209,094, dated Apr. 29, 2008, 12 pages.
Response to Jan. 22, 2009 notice of non-compliant amendment, U.S. Appl. No. 10/209,094, dated Jun. 8, 2009, 9 pages.
Response to Sep. 21, 2009 notice of non-compliant amendment, U.S. Appl. No. 10/209,094, dated Jan. 11, 2010, 19 pages.
Tenant data tapped into by landlords, The San Diego Union, Dec. 4, 1988, 5 pages.
"Move Your Apartment Inventory Online," http://replay.waybackmachine.org/20040122220720/http//www.vaultware.com, Jan. 2004, 1 page.
"Realty Data Trust: The Online Leasing Experts," http://replay.waybackmachine.org/20050717020250/http://www.vaultware.com, Jul. 2005, 1 page.
"Vaultware: Making It Easy to Lease," http:replay.waybackmachine.org/20060716123946/http://vaultware.com, Jul. 2006, 1 page, downloaded Mar. 1, 2011.
"Vaultware: Making It Easy to Lease," http://replay.waybackmachine.org/20070329015055/http://vaultware.com, Mar. 2007, 1 page, downloaded Mar. 2, 2011.
Non-final Office Action, U.S. Appl. No. 11/189,024, dated Jul. 20, 2010, 12 pages.
Non-final Office Action, U.S. Appl. No. 11/189,024, dated Apr. 28, 2009, 27 pages.
Non-final Office Action, U.S. Appl. No. 11/189,024, dated Dec. 1, 2009, 11 pages.
Response and Amendment to Apr. 28, 2009 non-final office action, U.S. Appl. No. 11/189,024, dated Jul. 27, 2009, 12 pages.
Response and Amendment to Dec. 1, 2009 non-final office action, U.S. Appl. No. 11/189,024, dated May 27, 2010, 14 pages.
What is the U.D. Registry, U.D Registry, Inc. Website Archive 1998, printed Jul. 13, 2007, http://web.archive.org/web/19980524113221/http://www.udregistry.com/who.htm; 12 page.
Patent Cooperation Treaty (PCT) Written Opinion, (Form/PCT/ISA/210), US Patent and Trademark Office as International Search Authority, PCT Application No. PCT/US06/29022, Applicant: RentPort, Inc., 5 pages, Mar. 23, 2007.

* cited by examiner

APPLICANT SCREENING

CROSS-REFERENCE TO RELATED APPLICATIONS

This application claims benefit of U.S. Non-Provisional patent application Ser. No. 13/558,781 entitled "Applicant Screening" and filed Jul. 26, 2012, which claims benefit of U.S. Non-Provisional patent application Ser. No. 11/189,024 entitled "Screening Using Personal Identification Code" and filed on Jul. 25, 2005, now U.S. Pat. No. 8,234,498, both of which are incorporated herein by reference in their entirety.

TECHNICAL FIELD

The invention relates generally to applicant screening, and more particularly to screening an individual or entity using a personal identification code.

BACKGROUND

Applicant screening is an important component in many applicant selection processes, including rental applicant screening, access screening, employee screening, mortgage applicant screening, university entrance screening, etc. Existing approaches may include paper applications and hand-entry of detailed application information by a screener in order to process the application. In an apartment rental scenario, for example, an applicant may fill out a paper application from which the property manager extracts information to submit a credit report request, a criminal background check, and other screening information requests. Based on the results of these submissions, the screener makes a decision regarding the application (e.g., accept, decline, etc.).

For larger institutional property managers, lenders, and employment companies, for example, screening software and systems exist to streamline this screening process. Detailed information extracted from the application can be electronically input by a screener through a computer-based screening service, which can generate a report on requested information (e.g., a credit report, a criminal background report, a lease history report, etc.) collected by a data aggregator. With these reports, the screener can make an informed decision about whether to accept or decline the application and under what terms. However, such computer-based screening services often require substantial training of the screener in order to properly install and configure an account for a computer-based screening service, to ensure the proper information is provided to the screening service (e.g., about the individual applicants) for each screening request, and to ensure that screening results are properly interpreted and applied in the decision-making process.

These existing screening services are often too complex and expensive for smaller businesses, property managers, or other smaller screeners. For example, a property manager who manages only a couple of rental units would likely benefit from access to a computer-based screening service but may not find the training time/costs of using the service itself to be cost effective. As such, smaller property owners are likely to forego the use of such screening services, choosing to screen their applicants using other methods (e.g., credit and criminal data resellers, faxed credit reports, manually calling references & previous landlords, and manually calling former employers).

Existing methods are also more prone to identity theft. The screening services (i.e., those that provide credit reports, criminal background data, and other consumer data) provide consumer-specific data to a screening service subscriber for a permissible purpose based on representations made the screening service subscriber. The screening services perform certain subscription or membership verifications on the requesters to minimize the chance that consumer data could be illegally accessed, but do not normally require consumer confirmation or authorization for each transaction. This practice may introduce avenues for identity thieves to illegitimately access consumer data files. Ideally, a screening service would be required to obtain specific authorization by the consumer (e.g., the screened individual) before providing any access by a screening service subscriber to the consumer's data. However, such a safeguard is not considered viable and so is not employed in the industry.

SUMMARY

Implementations described and claimed herein address the foregoing problems by distributing portions of the screening process to multiple sites and multiple participants and providing a personal identification code that identifies individual sets of screening results. In this manner, the applicant (e.g., a consumer) can enter appropriate applicant profile data into a secure screening account, such as via a screening kiosk (e.g., a computer with network access, a public computer terminal, etc.). The applicant may be authenticated prior to the issuance of a personal identification code. Authentication may be performed by various methods, including without limitation the use of applicant data on file at a data aggregator, biometric mechanisms or some other highly reliable mechanism for ensuring that the applicant granting access is actually the individual or entity authorized to grant access to the applicant's information.

The applicant can authorize the generation of screening results, which are associated with a unique personal identification code. This code can then be communicated to the screener, who can access the screening results along with a recommendation, if desired, by sending the code to a screening service provider. Based on the screening results, the screener can make a decision about the application and communicate to an applicant which action will be taken on his or her application. Communications among the various participants and components, including without limitation the application, the screener, the screening server, the screening kiosk, and one or more screening services, can take place via the internet and/or other communications media.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

BRIEF DESCRIPTIONS OF THE DRAWINGS

DETAILED DESCRIPTIONS

Figure 1:
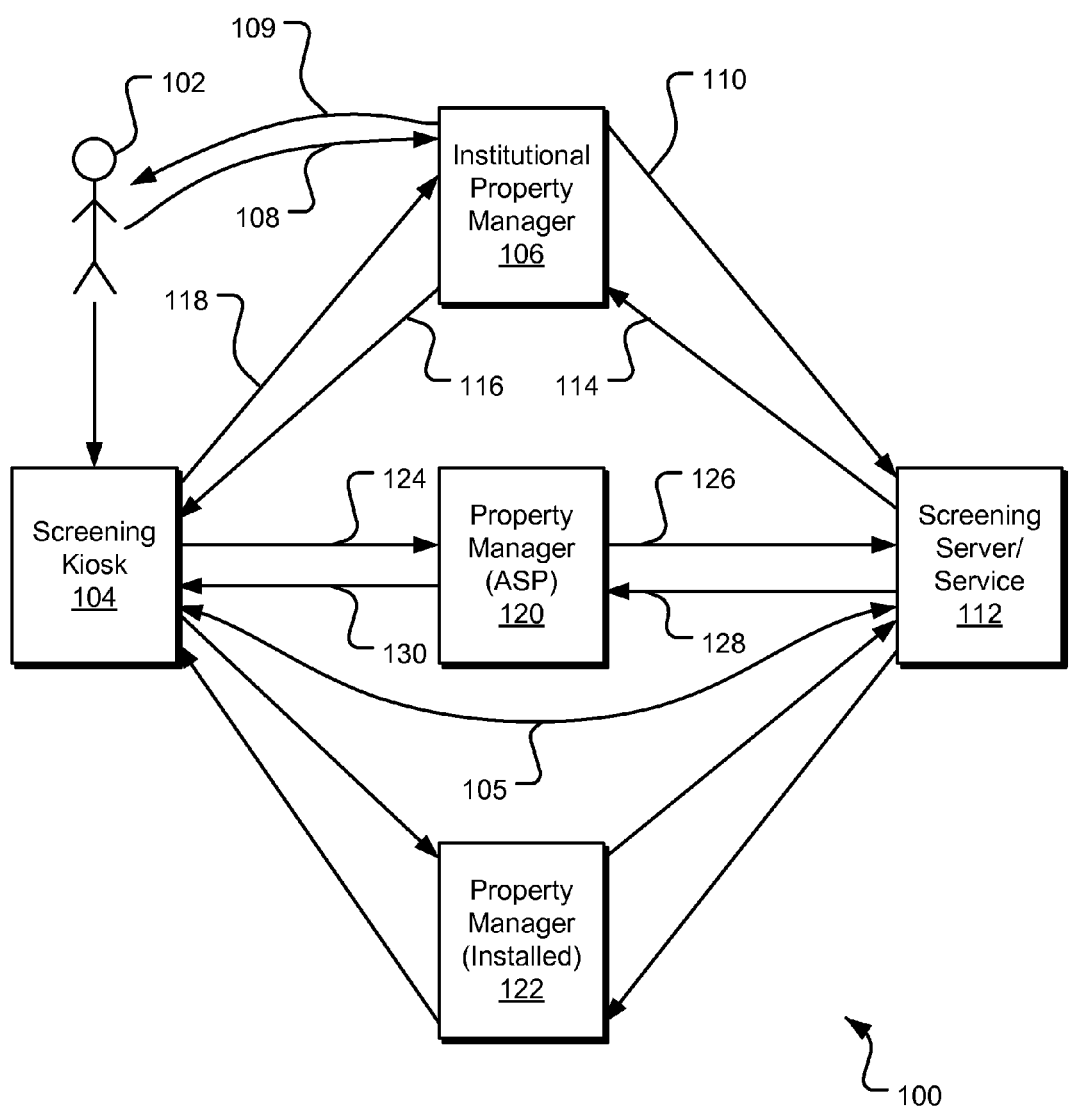
FIG. 1 illustrates an exemplary system for screening applicants.

Exemplary applicant screening systems and services, which can provide screening results about a consumer, allow consumer applicants and screeners to securely and efficiently generate and communicate application requests, screening parameters, screening results, and application results (e.g., screening decisions) via a communications network. Such systems and services may be employed in a variety of screening contexts, including without limitation criminal, credit, and lease history screening for employment applicants, leasing applicants, and any other consumer applicants or persons of interest FIG. 1 illustrates an exemplary system 100 for screening applicants. An applicant 102 accesses a screening kiosk 104, a web site, or another system access point. Such systems can be implemented on one or more computer systems or kiosks, including network-connected personal digital assistants (PDAs), cell phones, laptop computers, palm-based computers, desktop computers, and servers.

An institutional property manager 106 represents a class of property managers with sufficient volumes of property rentals to justify sophisticated applicant screening systems. Common characteristics of institutional property managers may include specially-trained screening personnel, customized screening procedures and parameters across multiple rental locations, a high-speed internet connection, professional management, a need for management reporting across multiple rental locations, a desire for a dedicated account agent at the screening service to manage the institutional property manager's account, and other characteristics. Typically, the property managers in this class subscribe to one or more screening services, train screening personnel to use the screening service(s) and to understand screening results, and interact closely with the screening service(s) to optimize their rental business.

In one scenario with an institutional property manager 106, an applicant 102 completes a rental application 108. Screening personnel of the institutional property manager 106 receives the rental application 108 and inputs relevant data 110 into a screening application, web-based form, or other form for submission to one or more screening services or data aggregators. In some circumstances, the data 110 is submitted to a screening service or data warehouse (e.g., a credit bureau) via facsimile. In other circumstances, the data 110 is submitted electronically through a dial-up connection or internet connection. Screening results 114, including possibly recommendations by the screening service, are returned to the institutional property manager 106 and are evaluated by the screener. Recommendations are typically generated based on a screening model and the available screening results. Exemplary recommendations may include without limitation "accept", "decline", "accept with increased deposit", "more information needed", etc. Based on this evaluation, the institutional property manager 106 can determine and communicate an applicant action 109 (e.g., a screening decision) to the applicant 102 (e.g., by mail or telephone). Exemplary applicant actions may include without limitation an offer of acceptance, a declination, a request for more information, or other responses.

In an alternative scenario, an institutional property manager 106 may accept a personal identification code 118 (e.g., a personal identification number or PIN) from an applicant 102 in order to obtain screening results 114 for the applicant 102. In this scenario, the applicant 102 may obtain the personal identification code 118 from the screening kiosk 104. If the applicant 102 does not already have an account with the system 100, he or she is given the opportunity to create a new account by providing applicant profile information, which may include without limitation identification information, a login ID, a password, and other data. The applicant 102 is authenticated by the system through the use of one or more authentication mechanisms within the screening kiosk 104, which may also including communication with the screening server/service 112 or other consumer-authenticating information. One method involves use of a fraud management platform that authenticates an applicant through a series of questions that only the applicant would be likely to know. Exemplary questions may include demographic questions, such as "On which of these streets have you lived previously?", or credit questions, such as "What is the current balance of your first mortgage?" If an account already exists, the applicant 102 is given the opportunity to log into his or her account via the screening kiosk 104. It should be understood that other system access points may be used for this purpose as well.

Personal identification codes may be limited to a single use or a limited number of uses, for use by a single screener, or for a limited period of time. For example, a screener may have up to three uses of the personal identification code over the course of a week to review the applicant's screening results before the personal identification code is no longer valid.

The screening kiosk 104 communicates the applicant profile to a screening server 112 via a communications link 105. The screening server 112 represents a computer system of a screening service or multiple computer systems at multiple screening services. In one implementation, a single server 112 acts as a centralized screening service by requesting, receiving, and processing screening results from other screening services. For example, one screening service may provide a request, with appropriate applicant data, for a credit report from a credit bureau. The same screening service may also provide a request, with appropriate applicant data, for a criminal background check from a criminal records database service.

Through the screening kiosk 104, the applicant 102 can then select (and possibly pay for) the types of screening results 114 he or she wishes to be made available to the property manager 106. In another implementation, the types of screening results may be selected by the property manager 106. Based on the applicant profile and the screening selections made by the applicant 102 and sent to the screening server 112 via the communications link 105, the screening server 112 accesses one or more data warehouse sources (e.g., credit bureaus, criminal records databases, leasing history databases, etc.) to obtain selected screening results 114 and associates a personal identification code 118 (e.g., a PIN) with the screening results 114. The personal identification code 118 is then communicated to the applicant at the screening kiosk 104 via the communications link 105 after the applicant 102 is authenticated via an authentication technique embedded in the system 100. Selected results from the screening results may also be communicated to the applicant via the screening kiosk 104.

The applicant 102 can communicate the personal identification code 118 to a property manager 106 via email, via other electronic communication means, or manually. Given the personal identification code 118, the property manager 106 can access the selected screening results 114. In some circumstances, the screening results 114 may also include one or more recommendations received from the screening service(s). Based on the screening results, including possibly the recommendation(s), the property manager 106 can determine an applicant action 116 and communicate it to the applicant 102 electronically or manually.

As discussed previously, some property managers manage property portfolios that are smaller than that of what would normally be considered an institutional property manager. Nevertheless, such property managers would benefit from professional screening. A personal identification code implementation of a screening system 100, however, can offer such property managers an attractive alternative access to such services.

In one implementation, a property manager 120 or 122 has a dial-up or high-speed internet connection, or some other network communications link to a screening service or server 112. The property manager 120 uses an Application Service Provider (ASP) configuration to interact with the screening server 112 through a client computer. ASP-products can be accessed from a server via a web browser and typically do not require any other special software to be installed on the client computer. In this configuration, the applicant 102 obtains a personal identification code 124 after authentication through the system 100 and communicates it to the property manager 120 (e.g., by email or manually). The property manager 120 can use the personal identification code 124 to access the screening server 112 and obtain screening results 128 about the applicant 102. The screening results 128 may also include recommendations. The property manager 120 can provide the applicant action 130 directly to the applicant 102 (e.g., via phone call or email) or can respond through the screening server 112, such that the applicant 102 can view the applicant action 130 at his or her next login to the screening account.

In one implementation, the applicant 102 can direct that the property manager 120 to receive the screening results 128 electronically. For example, the property manager 120 may receive an email with a link to the applicant's screening results at the screening server 112. In this scenario, the property manager 120 may be asked if he or she would like to create an account on the screening server 112 in order to more easily access other screening results. Alternatively, if the property manager 120 already has an account on the screening server 112, the property manager 120 may be notified of the screening results 128 both by email and when they log into the account.

The property manager 122 uses a desktop-installed application (e.g., a screening-specific software package purchased through a direct or retail channel, a screening feature integrated into another direct or retail software package, etc.) to interact with the screening server 112 through a client computer. This configuration may include, for example, a small business accounting package with an applicant screening feature that manages communications with the screening server 112 or opens a browser to allow ASP-type interaction with the screening server 112.

In a manner similar to that of the ASP configuration, the property manager 122 receives notification of screening results of an applicant. The property manager 122 access the screening server 112 to access the screening results (e.g., by submitting the applicant's PIN or following a link to the screening server). One advantage of the "installed" configuration is bundling the PIN-based screening feature with other business packages can provide more effective marketing channels. In addition, integration with such packages can also allow the various business features to work together. Finally, an "installed" software package may be sold in retail settings, thereby providing an alternative marketing platform as compared to an online ASP configuration.

Figure 2:
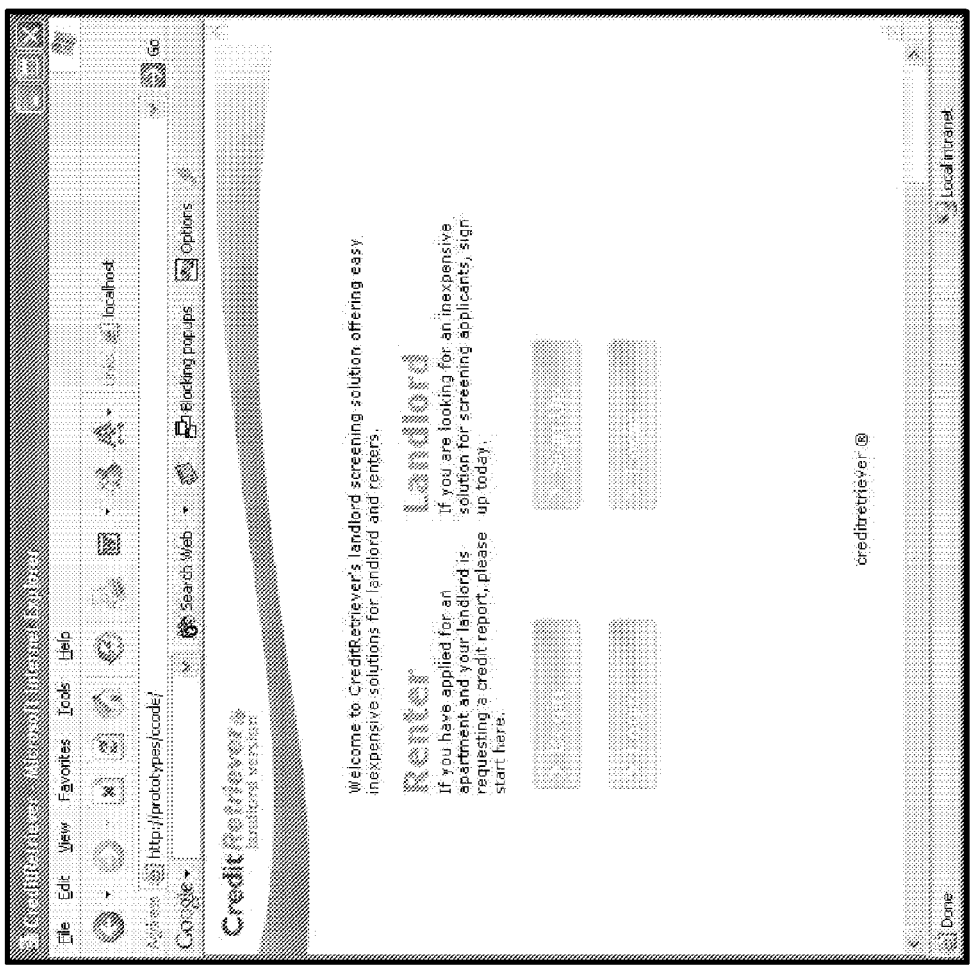
FIG. 2 illustrates a "Welcome" screenshot from an exemplary system for screening applicants.

FIG. 2 illustrates a "Welcome" screenshot 200 from an exemplary system for screening applicants. An applicant (e.g., a renter) has a choice of creating an account ("Begin") or logging into an existing account at a screening kiosk or other access point. A property manager (e.g., a landlord) has a choice of creating an account ("Sign Up") or logging into an existing account at a web site or application screen. Exemplary system flows for both applicants and property managers are described with regard to the following figures.

Figure 3:
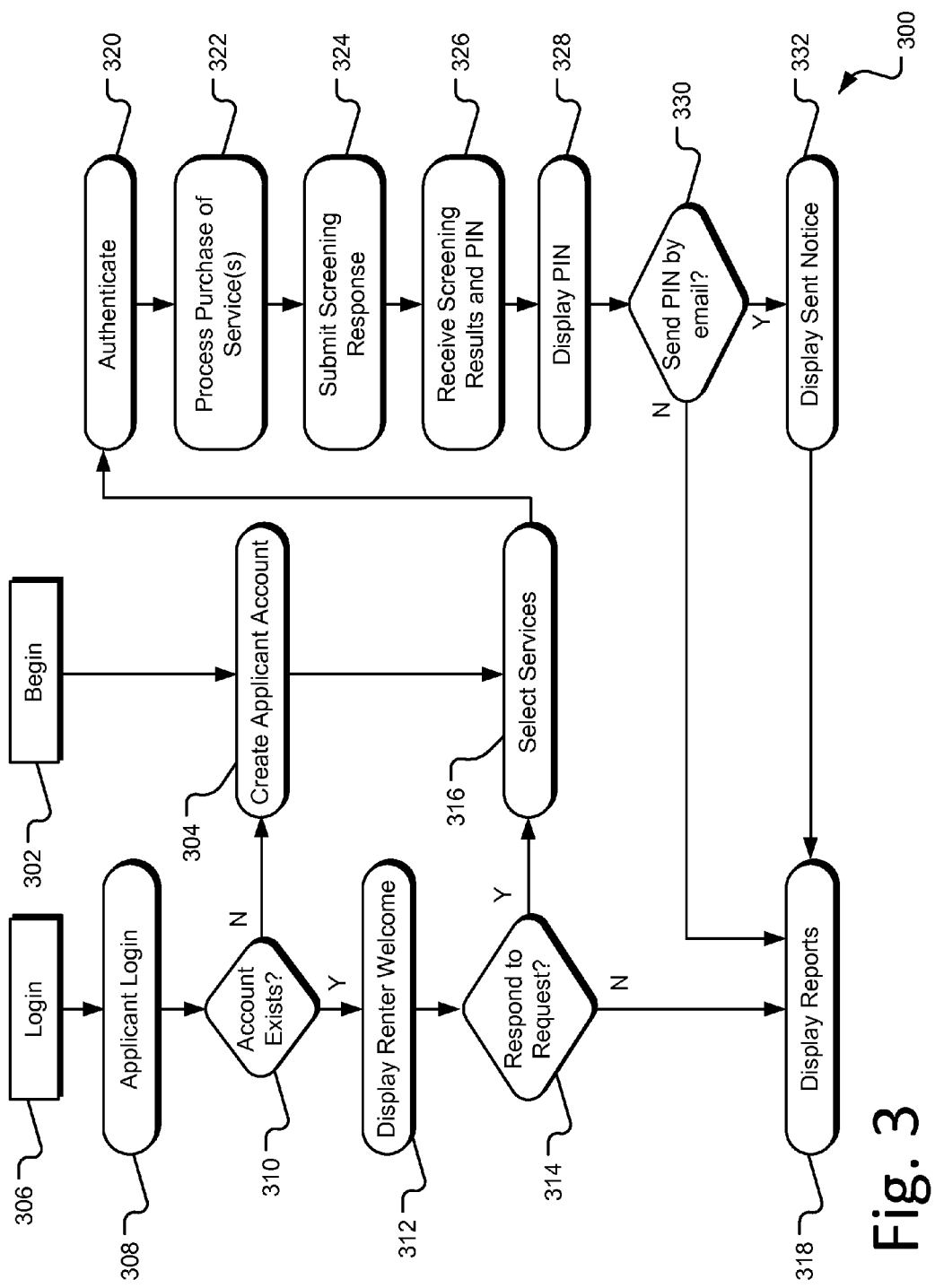
FIG. 3 illustrates exemplary operations for processing an applicant's use of an applicant screening system.
Figure 4:
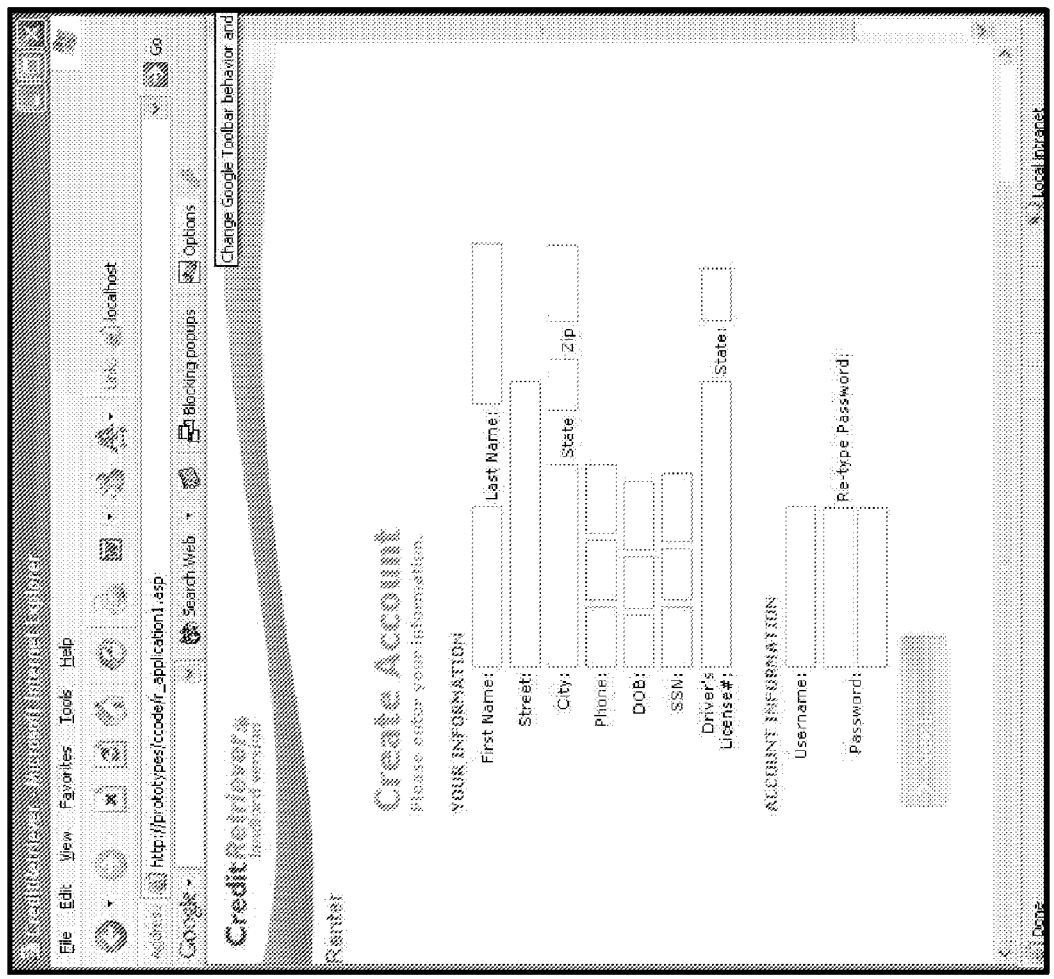
FIG. 4 illustrates a screenshot for creating an applicant's account in an exemplary applicant screening system.

FIG. 3 illustrates exemplary operations 300 for processing an applicant's use of an applicant screening system. In an account creation operation 304, if the applicant selects the Begin option 302 at the Welcome screen, the applicant can enter relevant identification, login, and password information, and any other information (collectively, "application profile information") useful in screening applicants. An exemplary Create Applicant Account screen 400 is illustrated in FIG. 4. In one implementation, the applicant may terminate the process after creating an account, so that he or she may return at a later time to use the service.

If the applicant selects the Login option 306, an applicant is given the opportunity to log into the screening kiosk (e.g., is prompted for a login identifier and a password) in a login operation 308. If the login fails, as judged by a decision block 310, the applicant is directed to the account creation operation 304. After the applicant has created an account, he or she will not have any requests from landlords yet so the applicant is directed to a service selection operation 316 (see screenshot 500 in FIG. 5).

Figure 6:
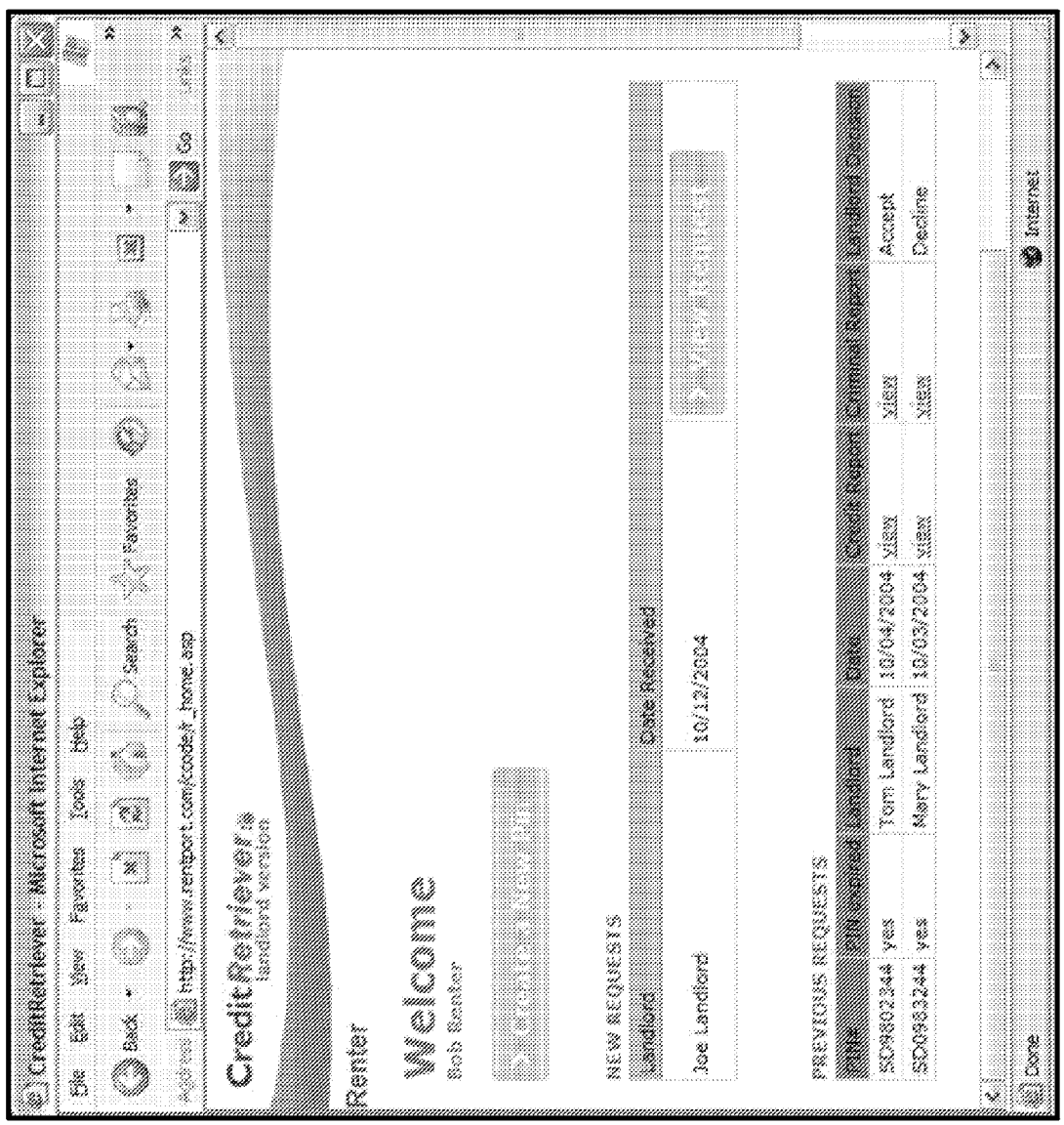
FIG. 6 illustrates a screenshot allowing an applicant to review application results and to initiate a new application in an exemplary applicant screening system.

After login, a Renter Welcome screen (see screenshot 600 in FIG. 6) is displayed to the applicant in a display operation 312, which presents a list of application requests (e.g., from landlords) and available results of application requests (e.g., also from landlords). An application request may include without limitation a request from a landlord, loan officer, etc. requesting that the applicant provide certain background data (e.g., credit data, leasing history, criminal background data, etc.). A result typically includes the response to the application, such as "accepted", "declined" or "more information is required", although other responses are also contemplated. In addition, if the applicant is declined, the screening results on which the declination is based is available for viewing by the applicant (e.g., via hyperlinks to the corresponding reports).

Figure 7:
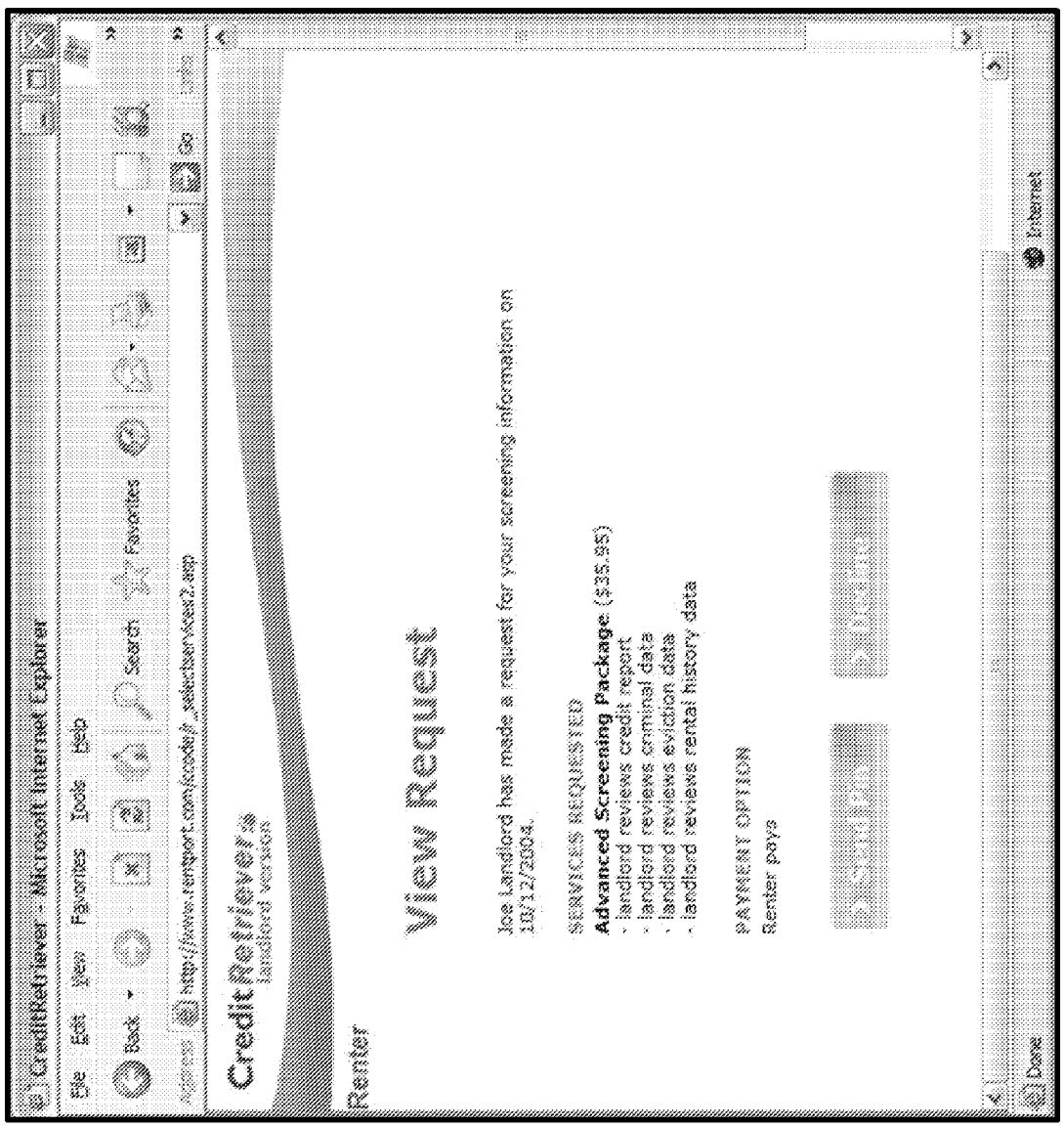
FIG. 7 illustrates a screenshot allowing an applicant to view requests for screening information in an exemplary applicant screening system.

If the applicant wishes to view a new request from a landlord, a respond operation 314 may be activated through the Renter Welcome screen. The applicant can choose to view reports from previously processed requests in a viewing operation 318, or by selecting "View Request", the applicant can view the screening information requested by a new landlord (see screenshot 600 in FIG. 6). Based on the information provided in a "View Request" screen (see screenshot 700 in FIG. 7), the applicant can choose to send a personal identification code to the landlord to authorize the landlord's access to the requested information or the applicant can choose to decline the landlord's request. To provide the requested information, the system directs processing from the View Request screen to a service selection operation 316.

Figure 5:
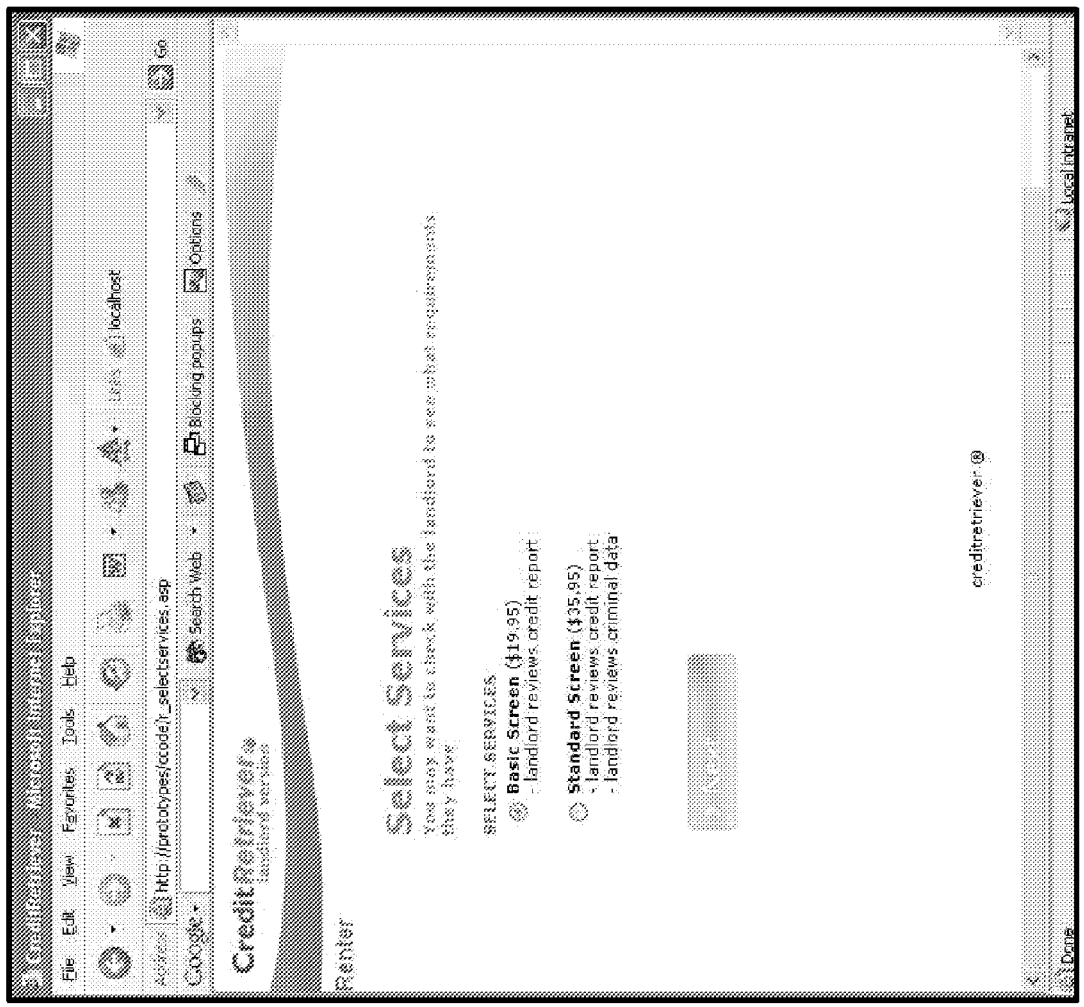
FIG. 5 illustrates a screenshot allowing an applicant to select screening services in an exemplary applicant screening system.
Figure 8:
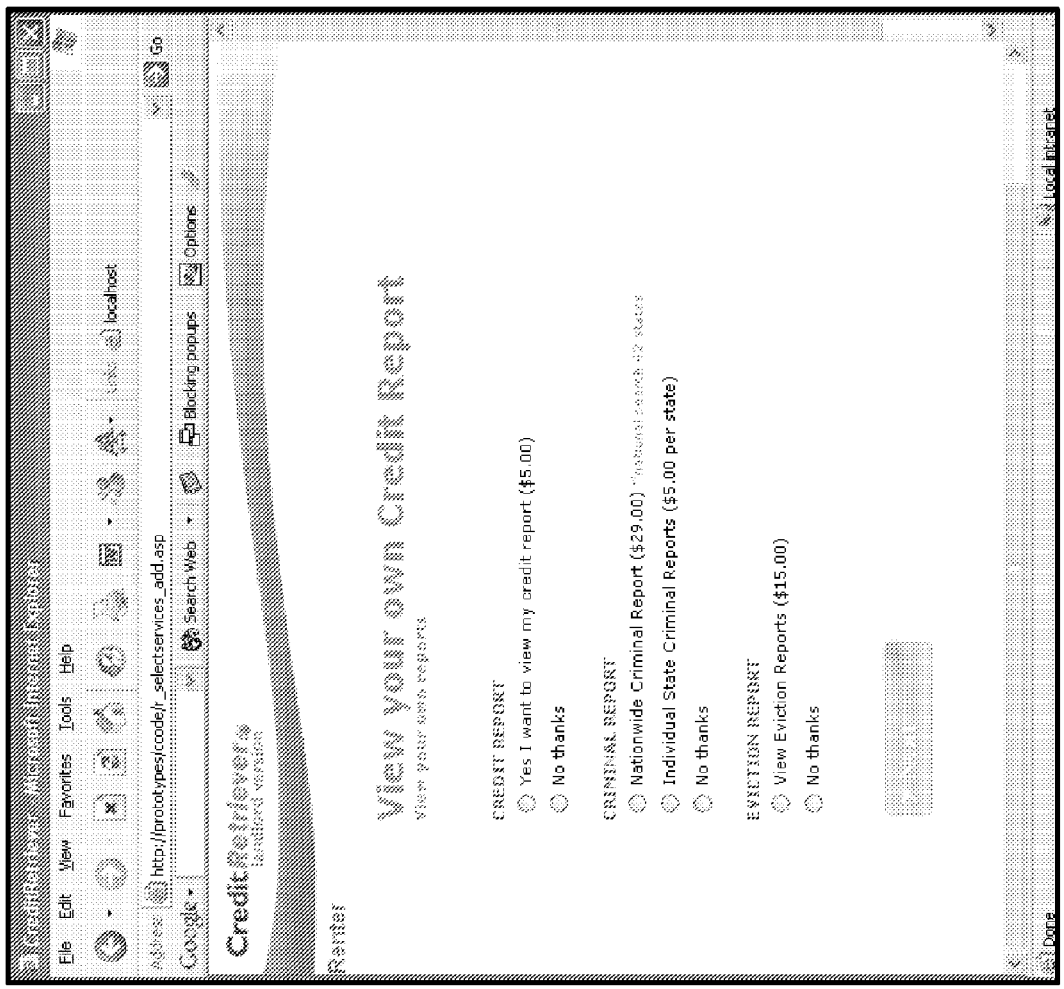
FIG. 8 illustrates a screenshot allowing an applicant to access screening information in an exemplary applicant screening system.

If the applicant wishes to respond to a new request or otherwise obtain a new personal identification code, the service selection operation 316 allows the user to select the types of screening services desired. While the screenshot 500 of FIG. 5 show only two options, any number of screen options and combinations thereof are contemplated. Services may be paid for by the applicant or by the landlord. The consumer may pay for the service, the landlord could pay for the service, or the two parties could share the costs. Such choices may be made available to the consumer during be available during enrollment. In one implementation, for example, the consumer may choose to pay for the data upfront and reduce the cost of making multiple applications. In addition, the applicant may choose to purchase and view his or her own screening results (see screenshot 800 of FIG. 8).

In one implementation, the applicant is authenticated for each grant of access (e.g., each transaction sending a personal identification code to a screener). Accordingly, in authentication operation 320, the screening server authenticates the applicant. Authentication may be performed according to a variety of techniques. An exemplary authentication may include a series of questions to which only the consumer would presumably know, such as specific information about their credit file. Other authentication methods may include without limitation biometric tests at the kiosk (e.g., fingerprint or retinal verification) and credit card or driver's license scanning. If the consumer fails the authentication for any reason, the service may be altered or terminated. For example, a personal identification code would only be issued via the U.S. Mail to the address held by the data warehouse for the requesting applicant.

Figure 9:
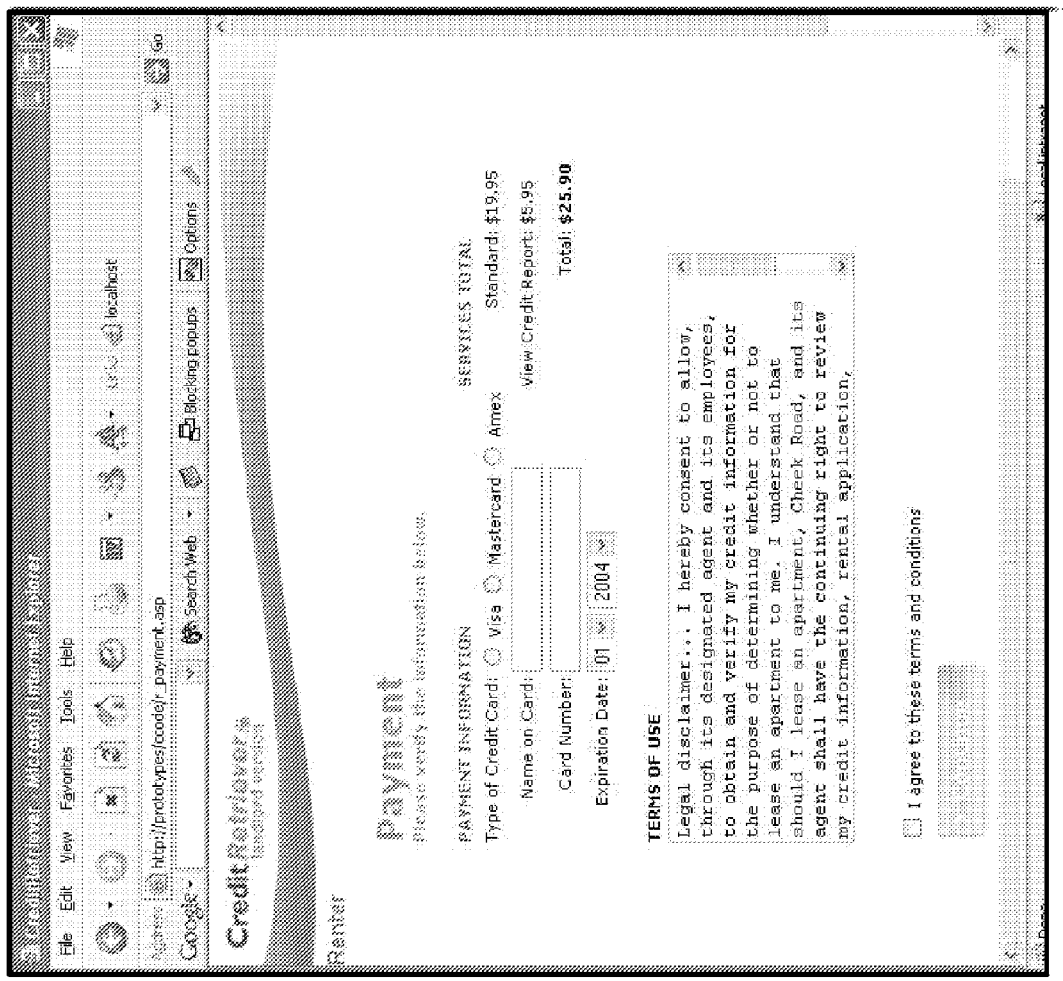
FIG. 9 illustrates a screenshot allowing an applicant to pay for applicant screening-related services in an exemplary applicant screening system.

If the applicant is paying for screening service(s), a processing operation 322 accepts payment information (e.g., credit card information) to process the purchase. (See screenshot 900 of FIG. 9.) Alternatively, the kiosk could support one or more currency acceptors that can receive and validate cash from the applicant. If only the landlord is paying or has paid for screening service(s), then the processing operation 322 may be skipped. A submission operation 324 submits the applicant profile information and service selections to the screening server via a communications channel, such as the internet. The screening server receives the application information and service selections (e.g., leasing history screening results, criminal background screening results, etc.) and performs the selected screening operations.

Figure 10:
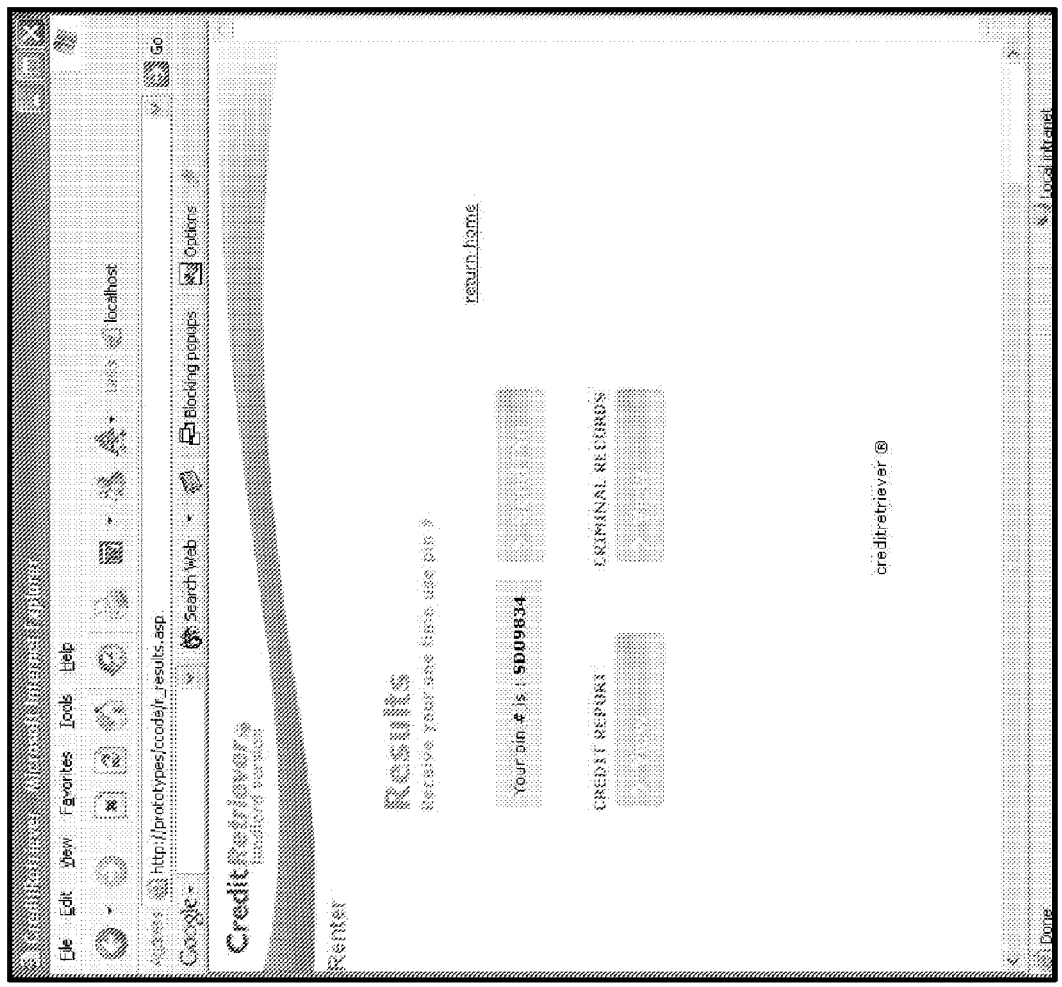
FIG. 10 illustrates a "Results" screenshot in an exemplary applicant screening system.
Figure 11:
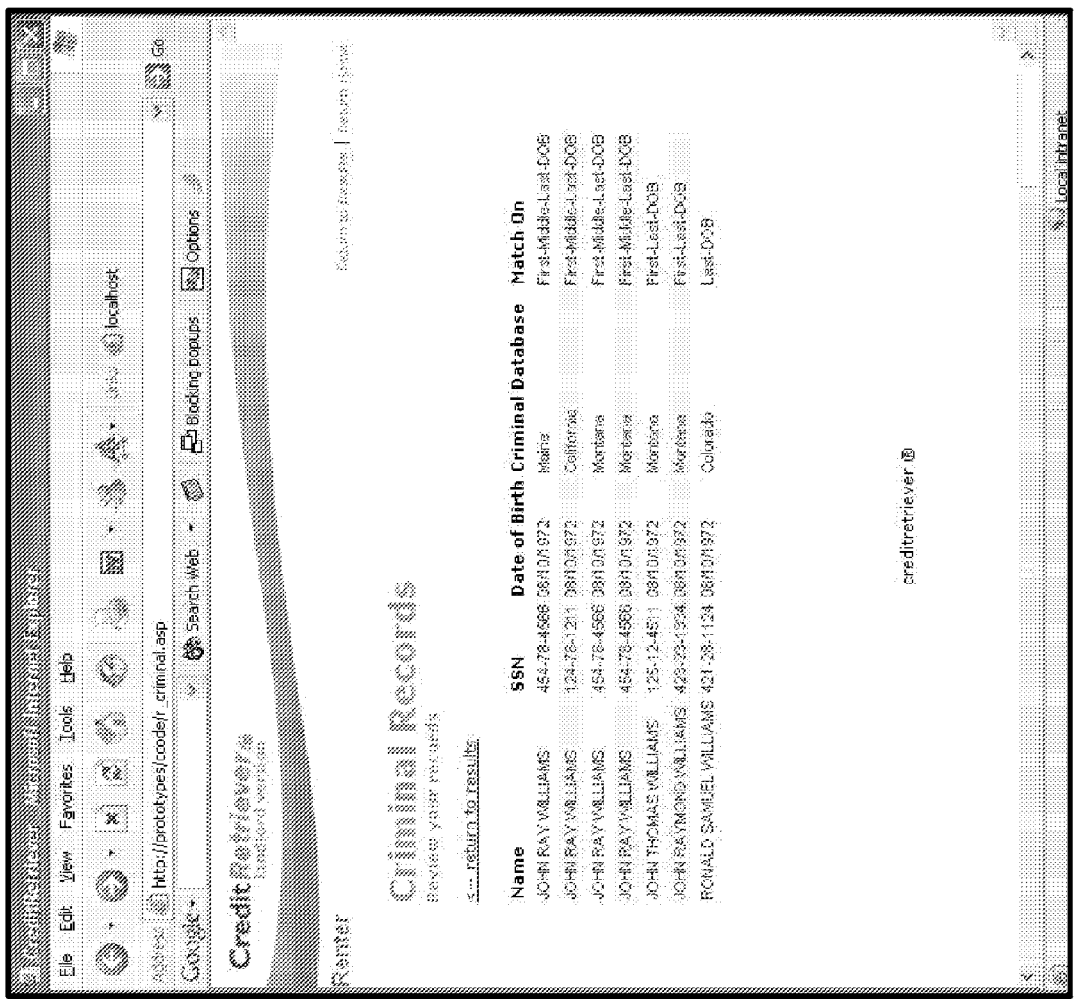
FIG. 11 illustrates a screenshot displaying criminal record selections of an applicant in an exemplary applicant screening system.
Figure 12:
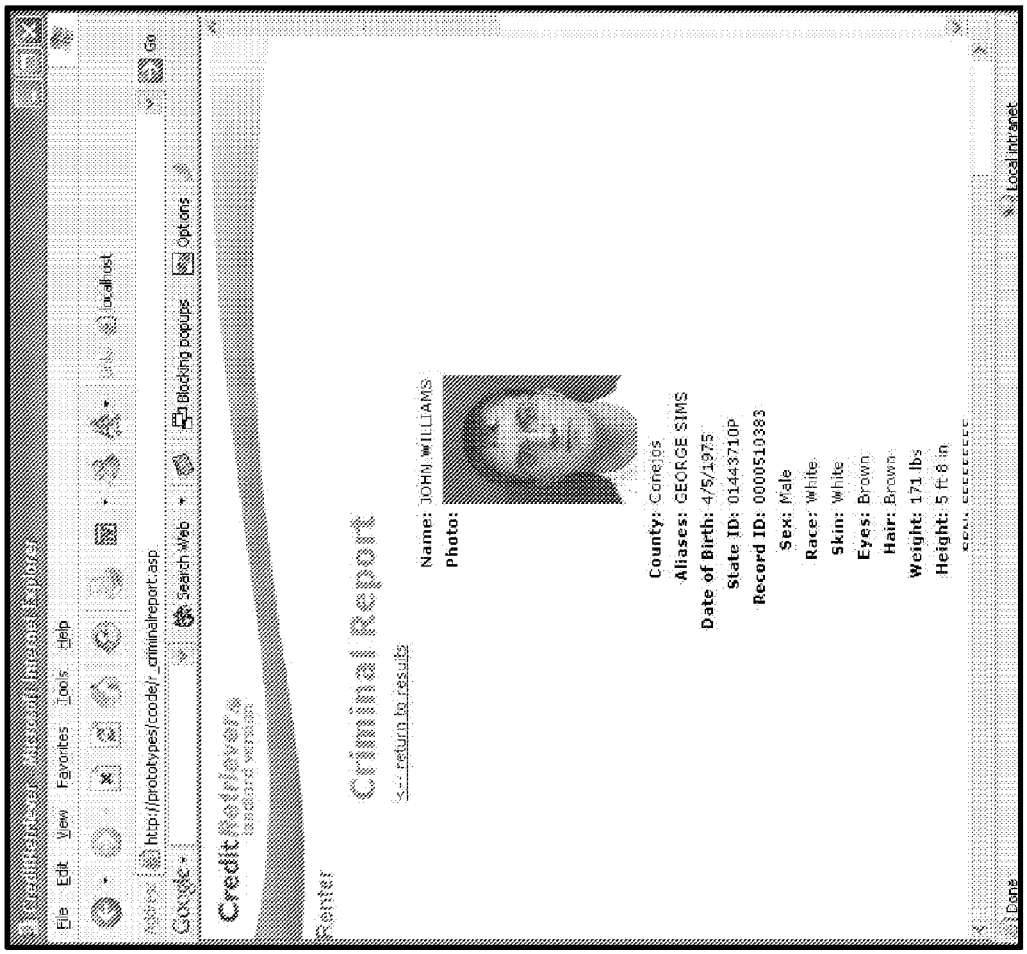
FIG. 12 illustrates a screenshot displaying detailed criminal record information of an applicant provided by an exemplary applicant screening system.
Figure 13:
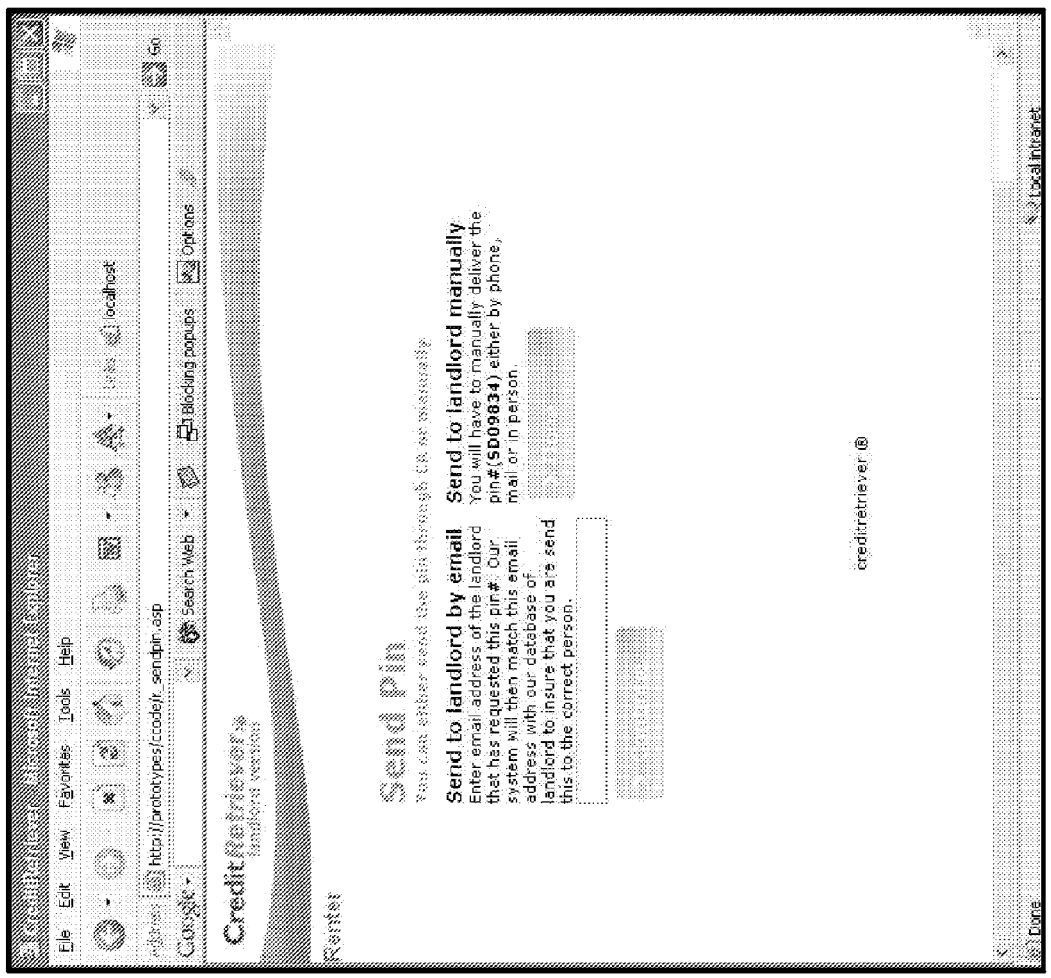
FIG. 13 illustrates an exemplary screenshot allowing an applicant communicate his or her personal identification code to a landlord.
Figure 14:
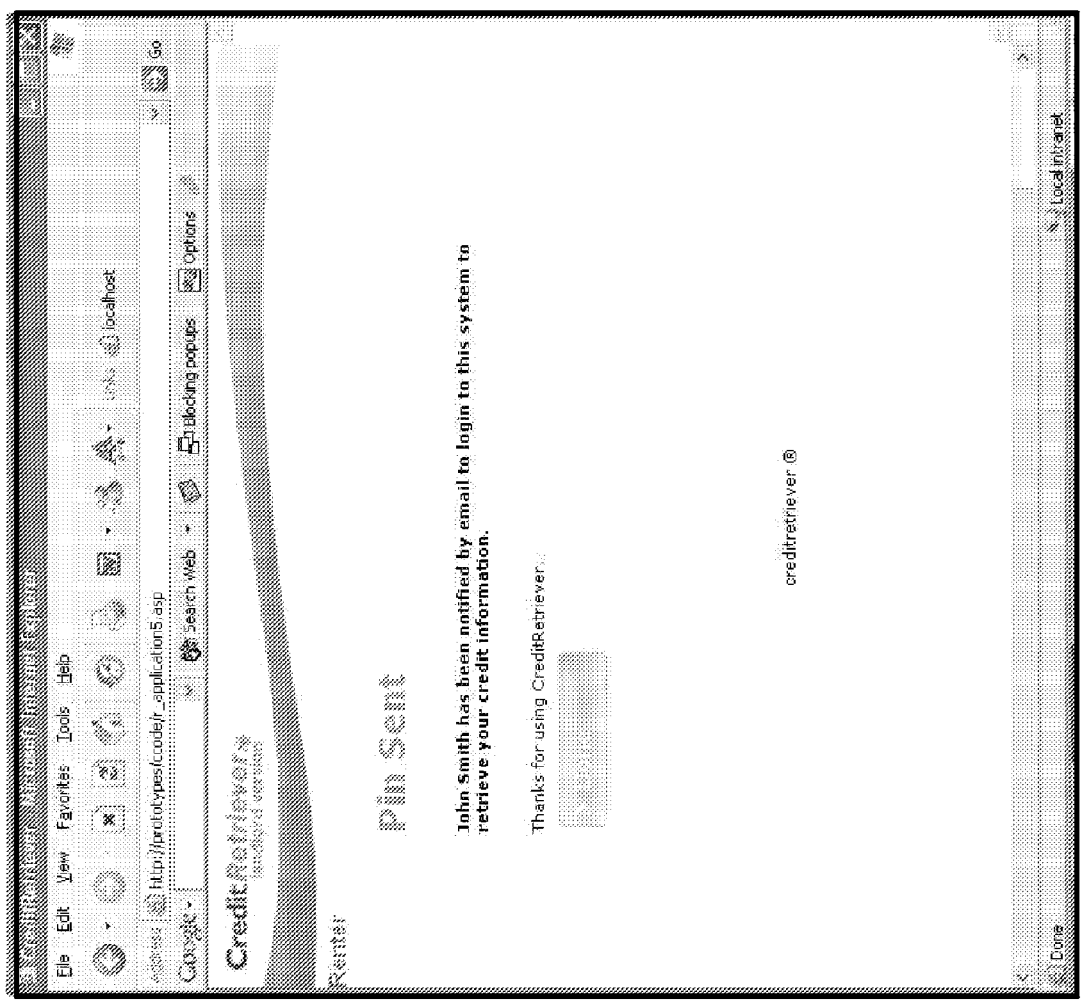
FIG. 14 illustrates a screenshot indicating a personal identification code communication in an exemplary applicant screening system.

In one implementation, as shown in the Results screenshot 1000 of FIG. 10, a personal identification code is displayed to the applicant. The applicant is also given choices of viewing various screening reports (e.g., credit report, criminal records, leasing history, employment history, etc.) and sending the personal identification code or "PIN" to a landlord. The PIN and other results options are displayed in a display operation 328. If the user selects "Send PIN" from the Results Screenshot 1000 of FIG. 10, then the applicant is offered the opportunity in a decision operation 330 to send the PIN to a landlord by entering an email address, or to send the PIN to the landlord manually (e.g., by phone, mail, facsimile, in person, etc.). If the applicant chooses to send the PIN by email, the PIN is sent to the email address specified by the application (see screenshot 1300 of FIG. 13) and a send notice is displayed in a display operation 332 (see screenshot 1400 of FIG. 14). Before or after operation 330 and/or operation 332, the applicant can view the returned screening reports in the display operation 318. Exemplary screening reports are displayed in screenshots 1100 and 1200 of FIGS. 11 and 12, respectively.

Figure 15:
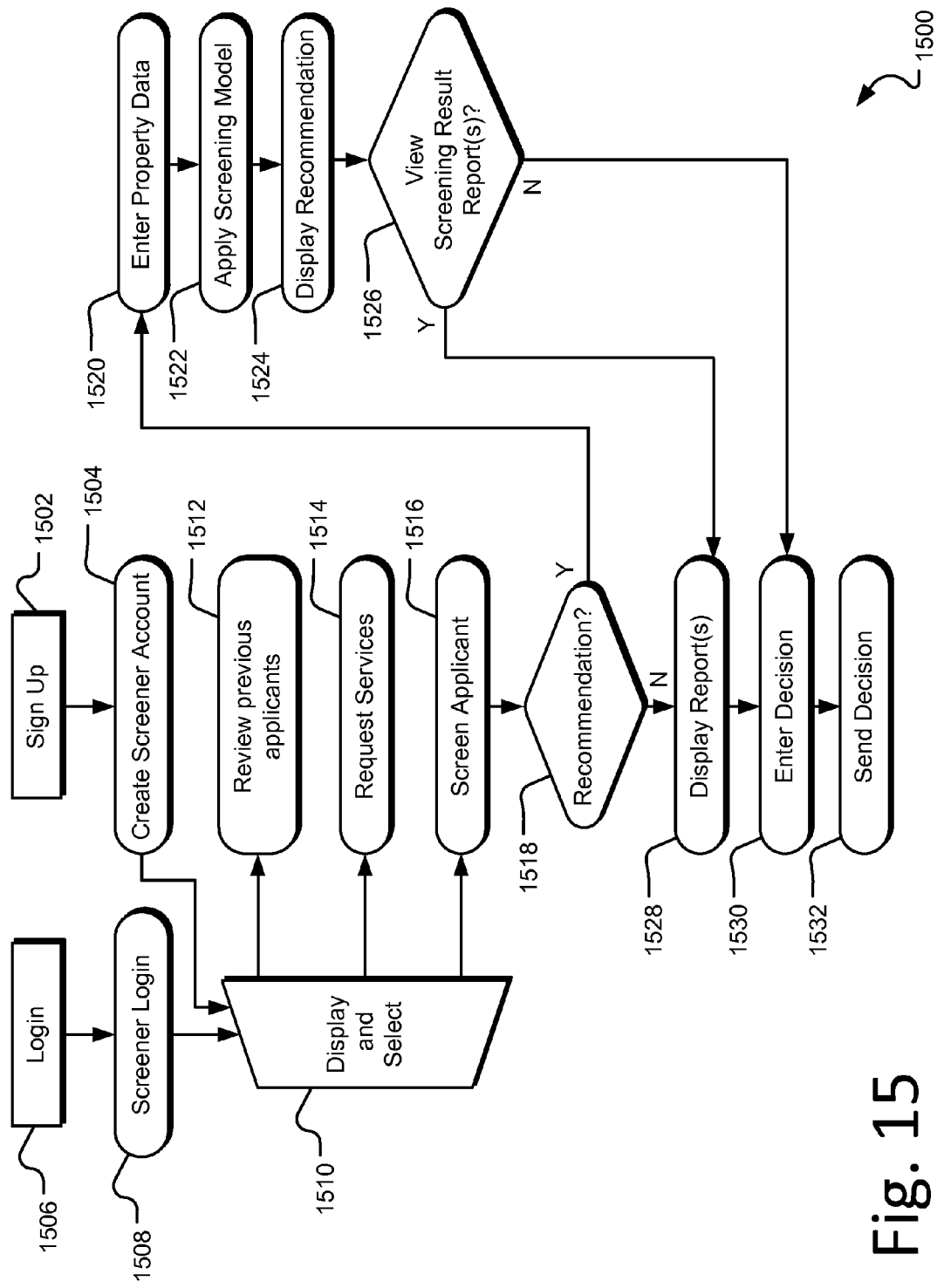
FIG. 15 illustrates exemplary operations for processing a screener's use of an applicant screening system.
Figure 16:
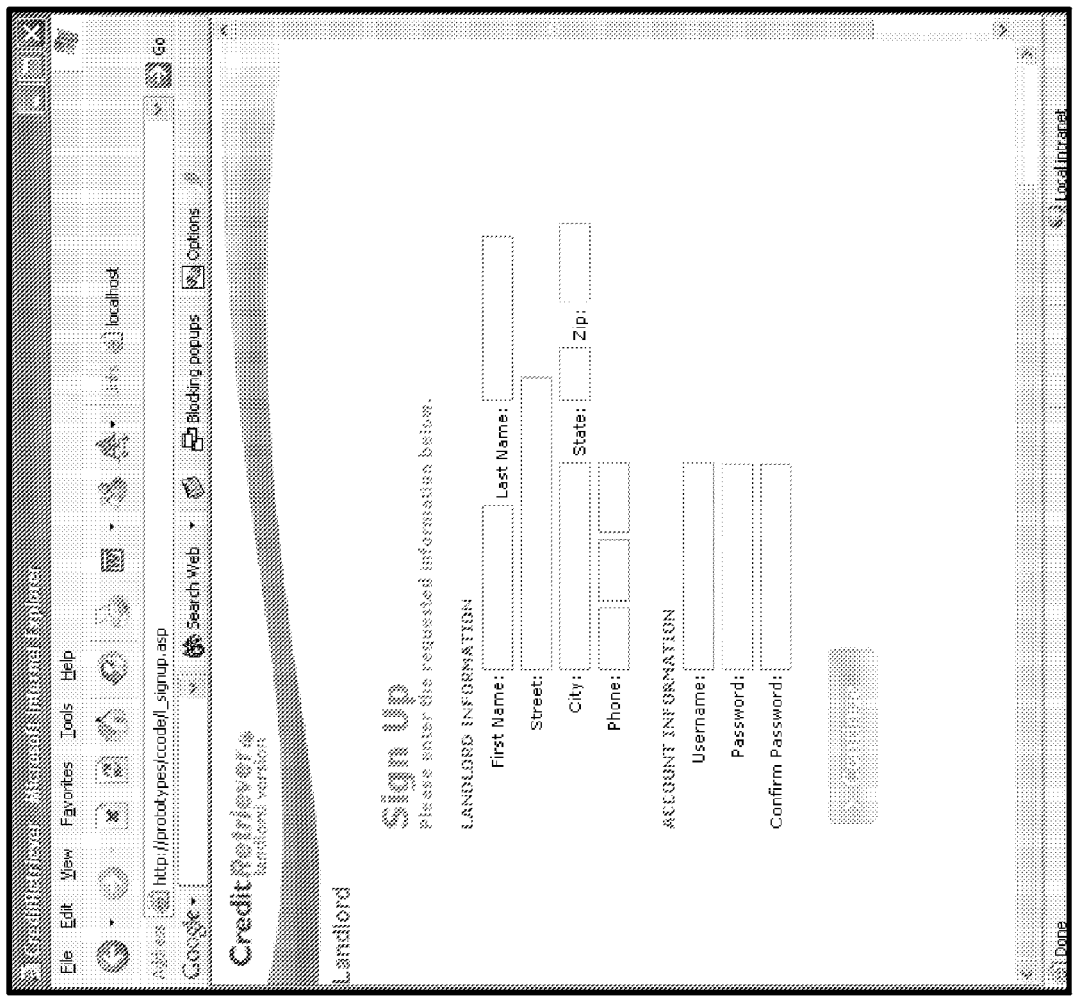
FIG. 16 illustrates a screenshot for creating a screener's account in an exemplary applicant screening system.
Figure 17:
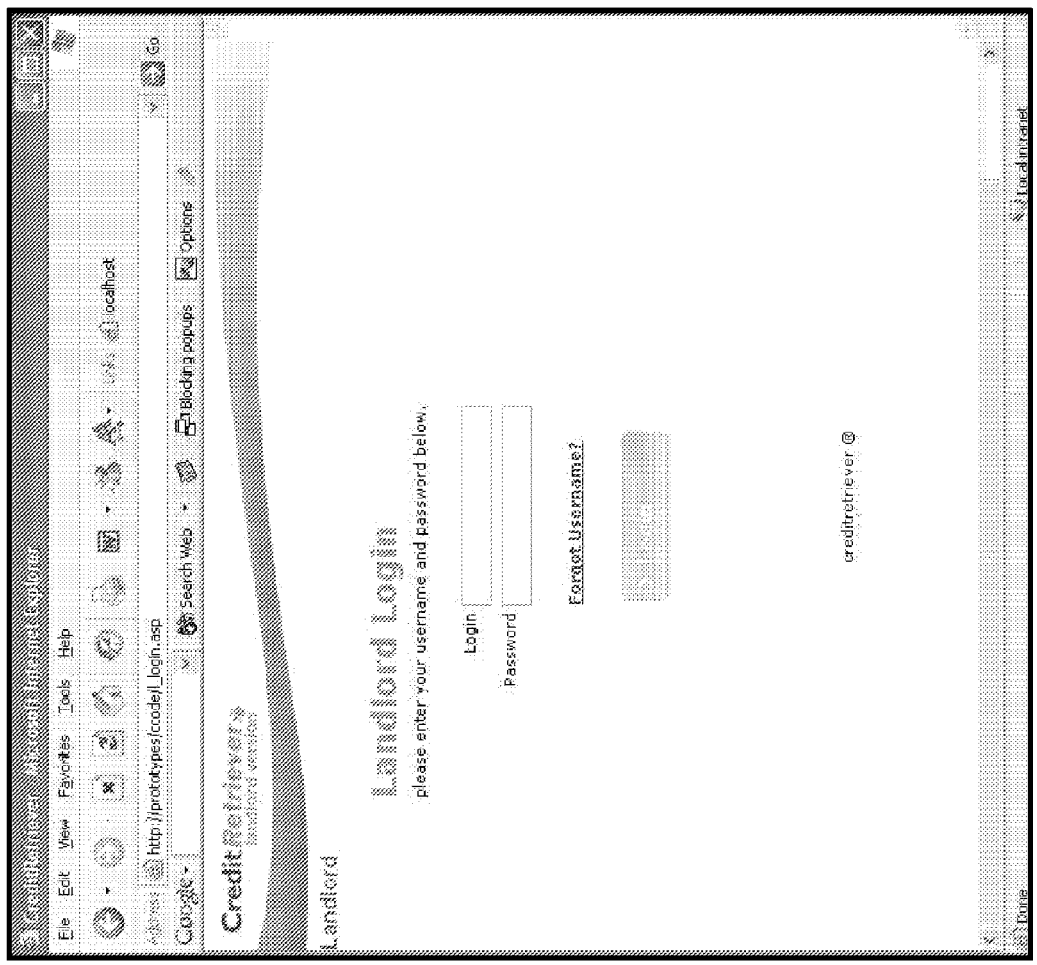
FIG. 17 illustrates a screenshot allowing a screener to log into an exemplary applicant screening system.

FIG. 15 illustrates exemplary operations 1500 for processing a screener's use of an applicant screening system. If the screener selects the Sign Up option 1502 at the Welcome screen, the screener can create a new account in an account creation operation 1504. The screener can enter relevant identification, login, and password information, and any other information (collectively, "screener account information"). An exemplary Create Landlord Account screen 1600 is illustrated in FIG. 16. If the screener selects the Login operation 1506 at the Welcome screen, a login operation 1508 authenticates the screener as a valid user of the system. See Login screenshot 1700 in FIG. 17.

Figure 18:
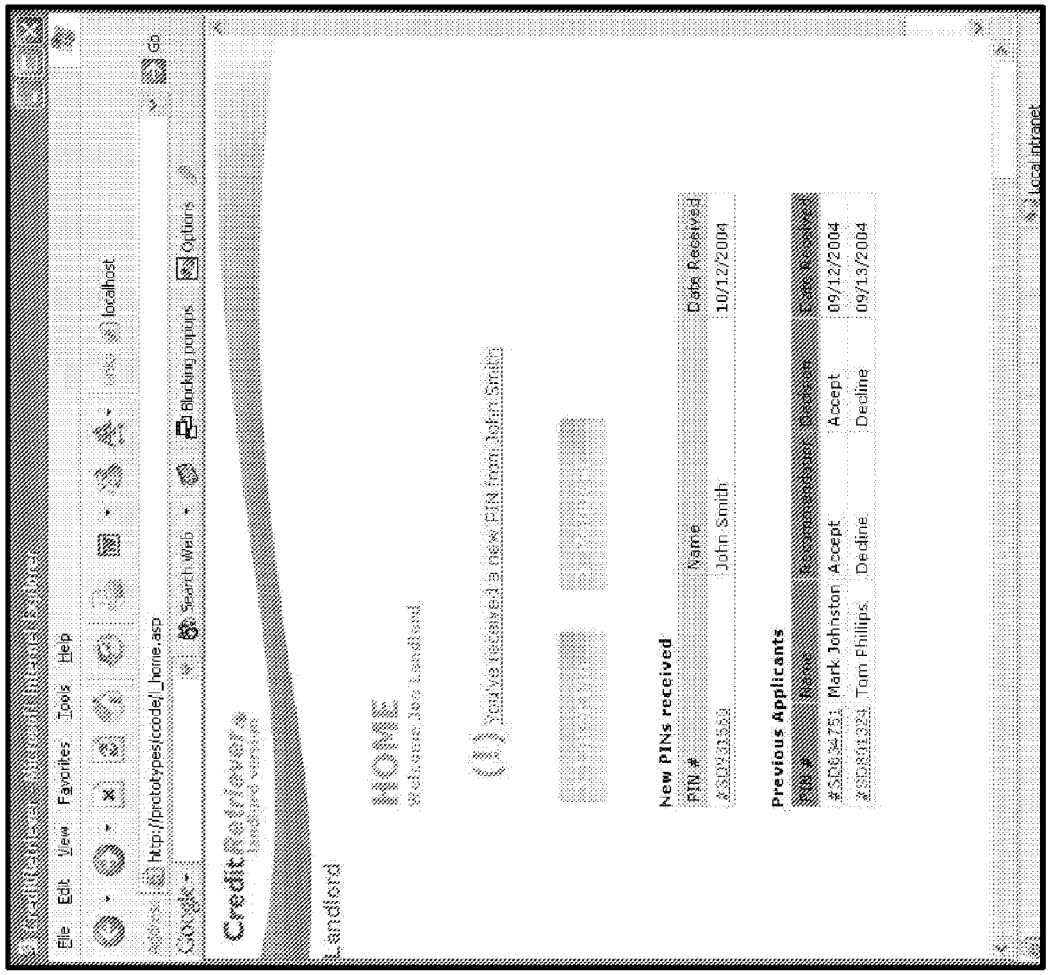
FIG. 18 illustrates a screenshot allowing a screener to view screening information in an exemplary applicant screening system.

After a screener is logged into the system, he or she is presented with various options and records of current and historical actions in Display and Selection operation 1510. See Home screenshot 1800 in FIG. 18. Newly received screening results (e.g., which have not yet been reviewed and/or acted upon by the screener) may be accessed through the "New PINs received" section. Previously viewed results may be accessed through the "Previous Applicants" section, which also shows the decisions made by the screener for each applicant. An "Enter Pin" option allows a screener to manually enter a personal identification code provided by an applicant. A Request option allows a screener to request a personal identification code and, thus, screening results from an individual applicant.

Figure 23:
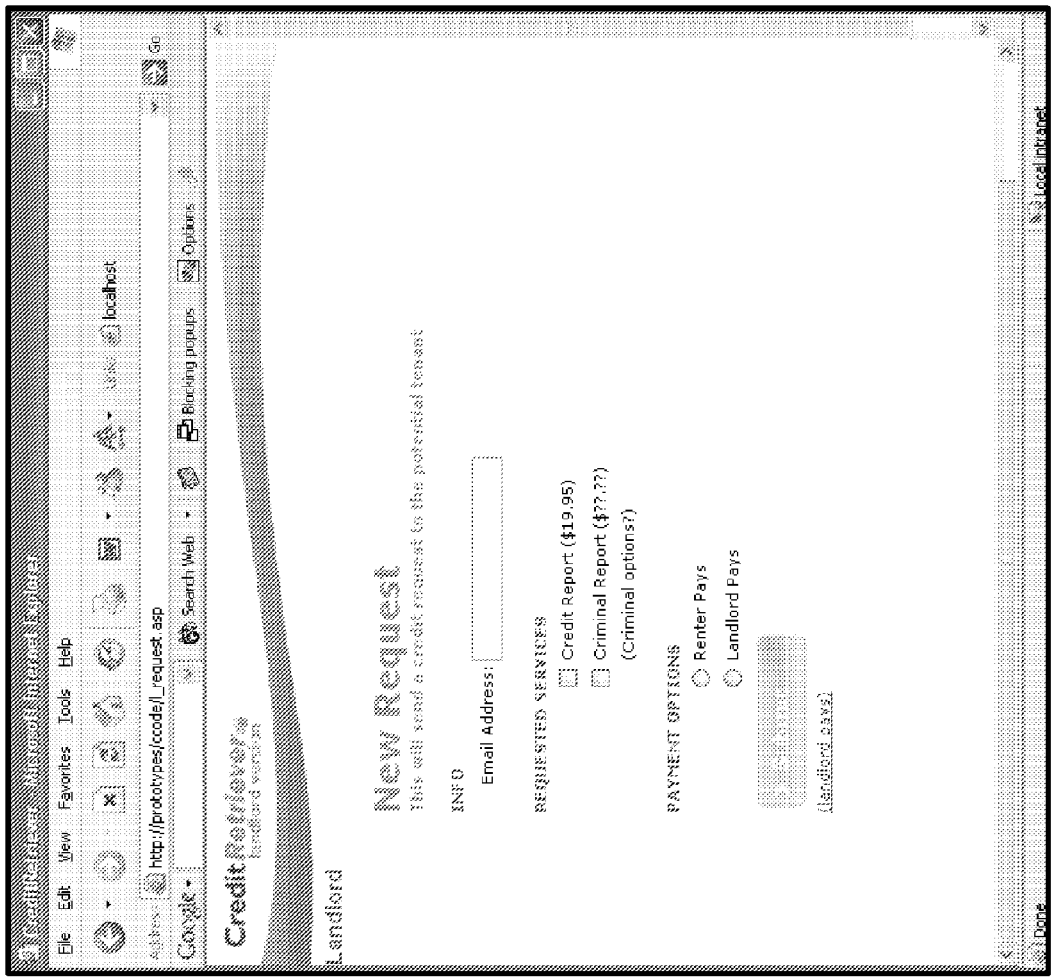
FIG. 23 illustrates a screenshot allowing a screener to send screening information to an applicant in an exemplary applicant screening system.
Figure 24:
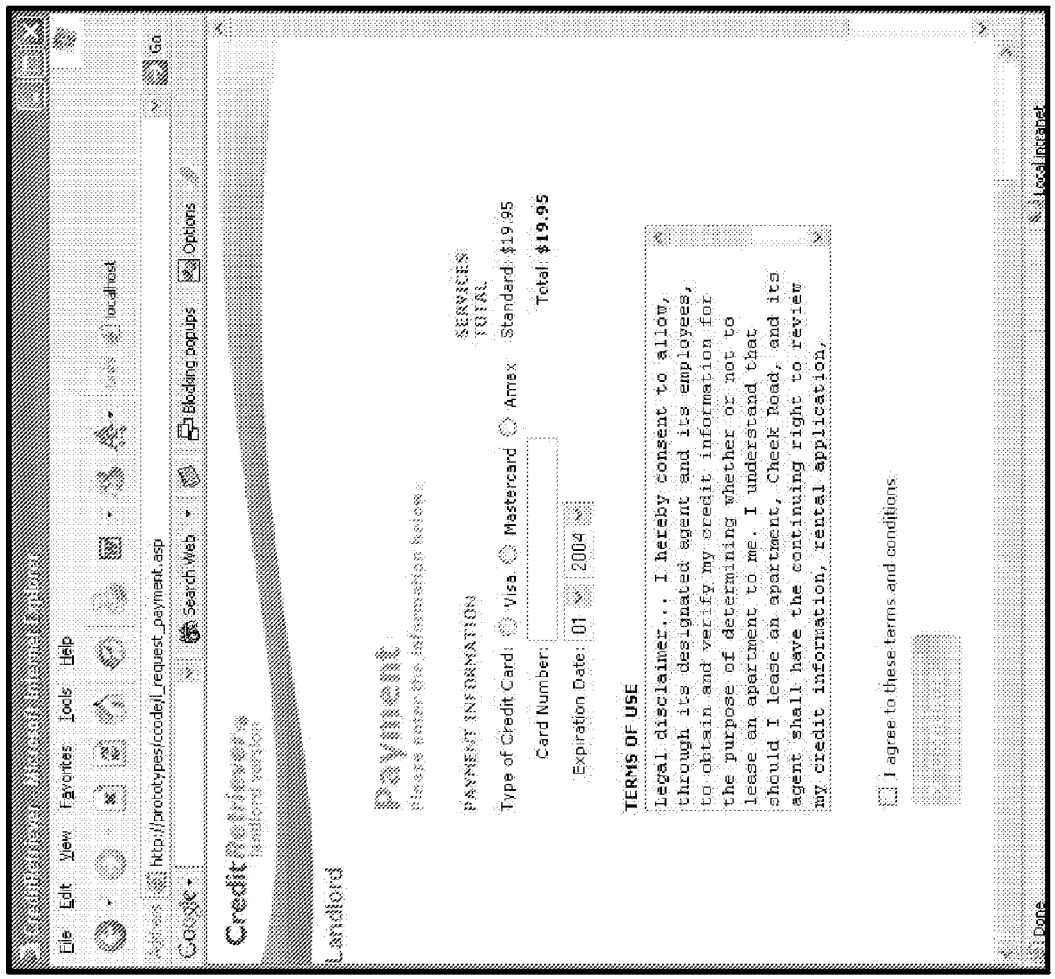
FIG. 24 illustrates a screenshot allowing a screener to pay for applicant screening-related services in an exemplary applicant screening system.
Figure 25:
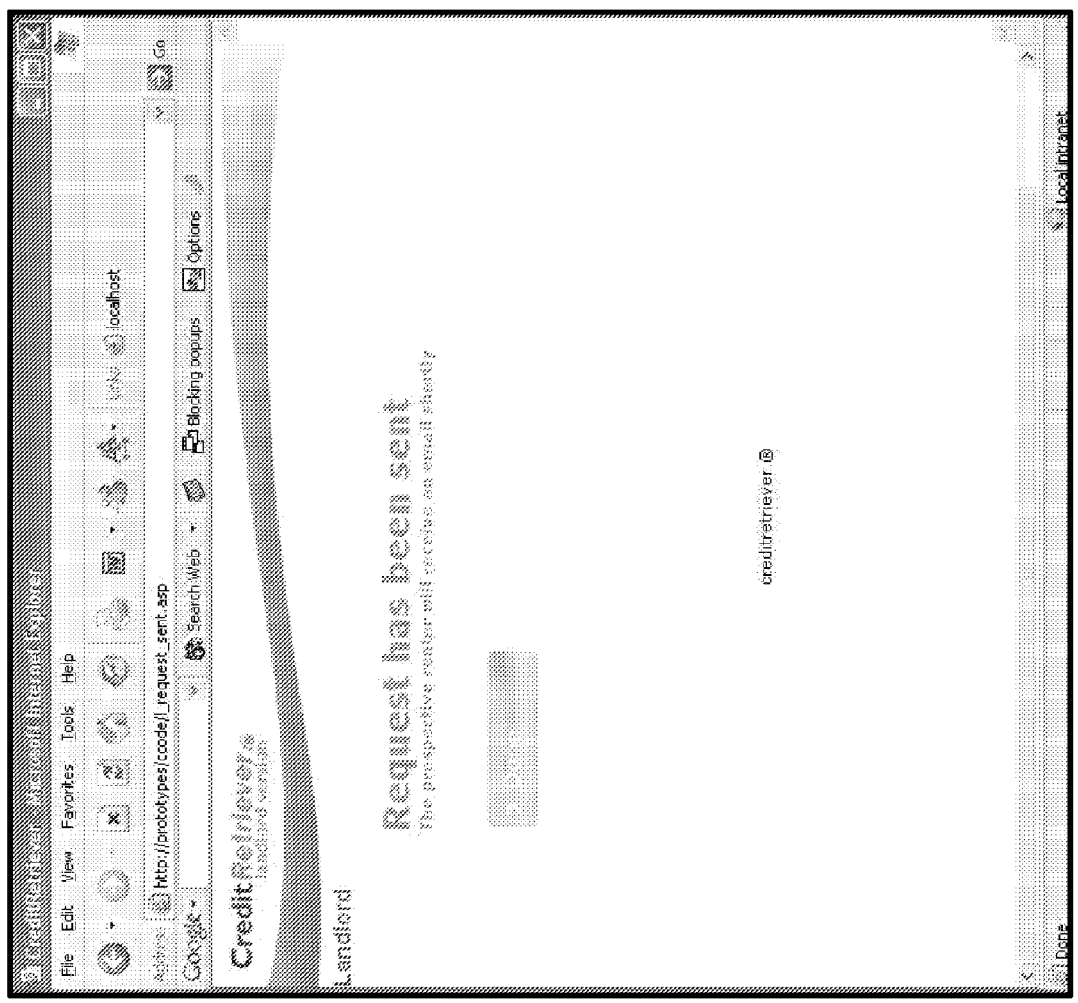
FIG. 25 illustrates a screenshot indicating communication by a screener to the applicant of a screening request in an exemplary applicant screening system.

If the screener elects to request screening results for a potential applicant, a Request Services operation 1514 will present the screener with a New Request screen (see New Request screenshot 23 of FIG. 23), where the screener can specify the email address of the potential applicant. The screener also identifies the screening reports he or she requires for an application and indicates whether the renter or the landlord will pay for the screening services. A Payment screenshot 2400 is shown in FIG. 24 to process landlord payments. A Request Confirmation screenshot 2500 is shown in FIG. 25, indicating that the screener's request was sent to the applicant associated with the provided email address.

Figure 21:
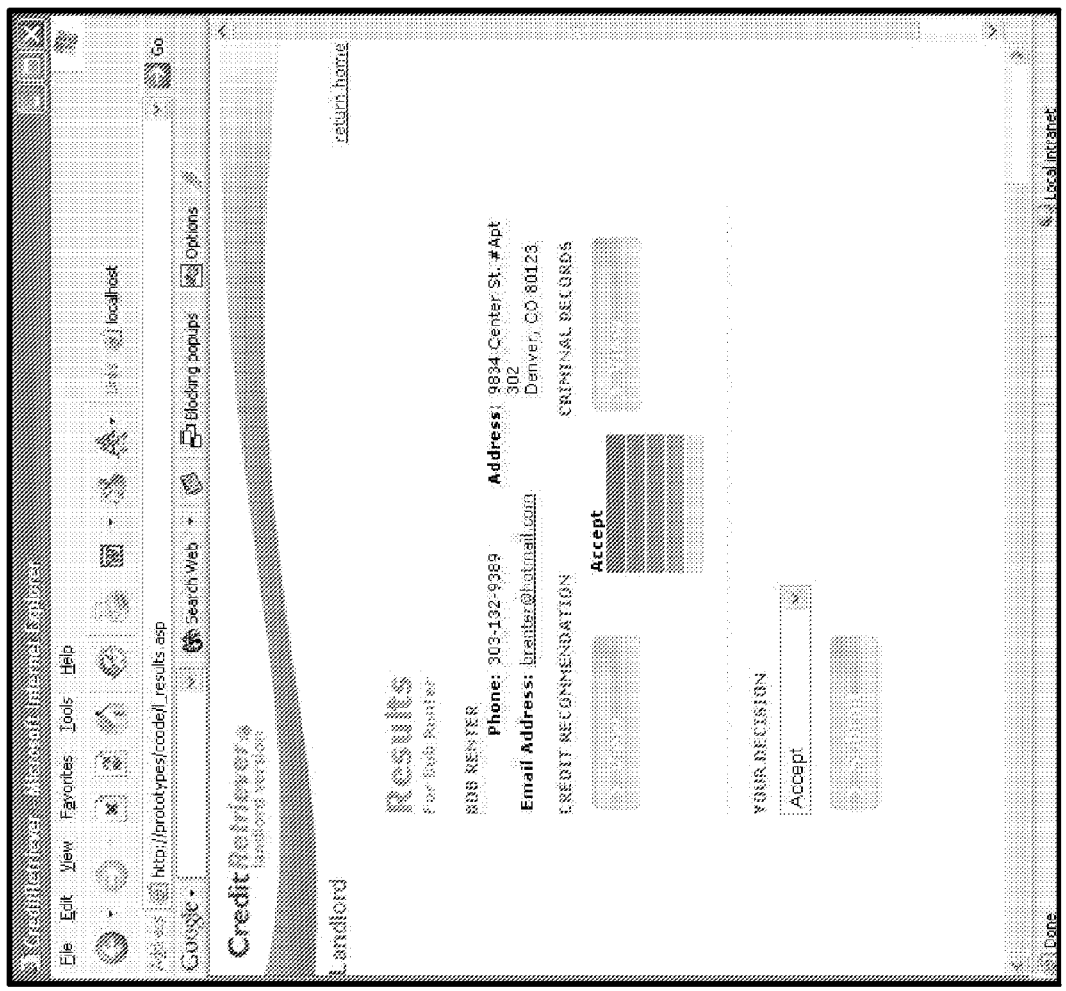
FIG. 21 illustrates a "Results" screenshot for a screener in an exemplary applicant screening system.

If the screener elects to view results/decisions of previous applicants (e.g., by selecting the hyperlink associated with the applicant's PIN), a screening results page is displayed in review operation 1512 (see, for example, Results screenshot 2100 in FIG. 21, although the decision is fixed when reviewing results for previous applicants).

Figure 19:
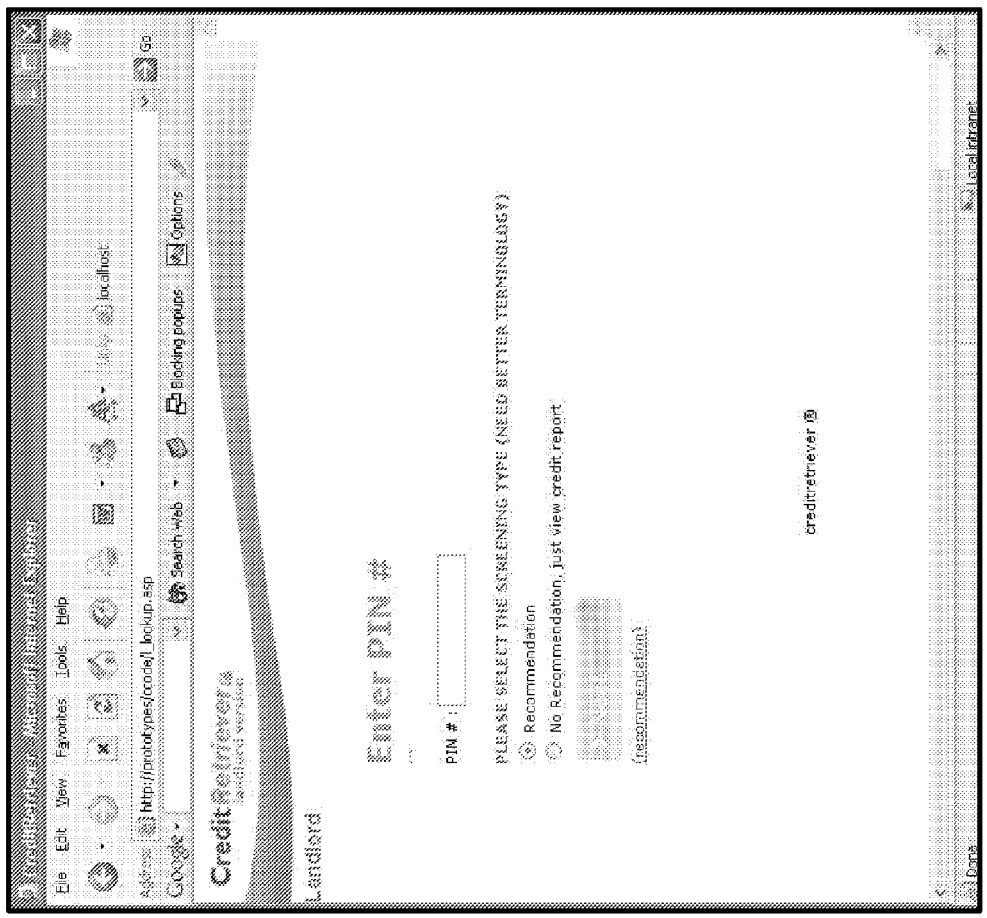
FIG. 19 illustrates a screenshot allowing a screener to view screening information using a manually entered personal identification code of an applicant in an exemplary applicant screening system.

If the screener elects to view a newly received PIN, which may have been submitted by an applicant on the applicant's own accord or in response to a request by the landlord, the Screen Applicant operation 1516 processes the screener's selection. If the selection was based on a manually entered PIN, the screener can enter the PIN through a screen such as that shown in Enter PIN # screenshot 1900 of FIG. 19. In the manual-PIN-entry portion of the Screen Applicant operation 1516, the screener can select whether he or she wants the screening service to provide a recommendation based on the screening results.

Figure 20:
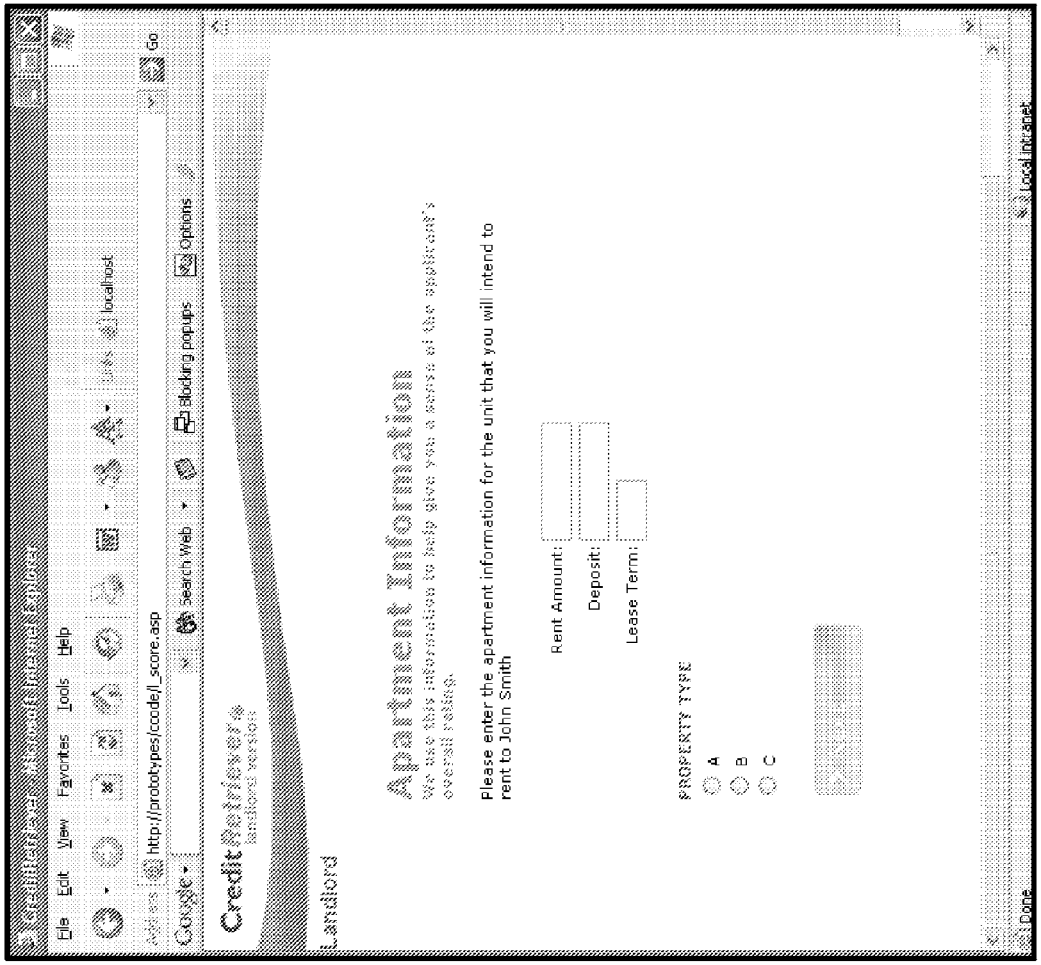
FIG. 20 illustrates a screenshot allowing a screener to enter property-specific data in an exemplary applicant screening system.

If a recommendation is requested, as determined by a decision operation 1518, the screener provides information about that which is applied for, such as an apartment, in a data entry operation 1520. (See the Apartment Information screenshot 2000 in FIG. 20.) In an alternative example, the applicant may be applying for a loan, so the screener may enter information about the desired loan or the system may be preconfigured with appropriate loan information. Other scenarios may involve job descriptions, university entrance requirements, etc.

A modeling operation 1522 applies the screening model to the property data and the applicant's screening results. In one implementation, the property data is sent to a screening server, which applies a server-based screening model to the property data and the screening results. In another implementation, the screening model is resident on the screener's computer system, where the model is applied to the data. In addition, this application could occur elsewhere, including at third-party servers. The modeling operation 1522 generates a recommendation, which is displayed to the screener in display operation 1524. See Results screenshot 2100 in FIG. 21.

Figure 22:
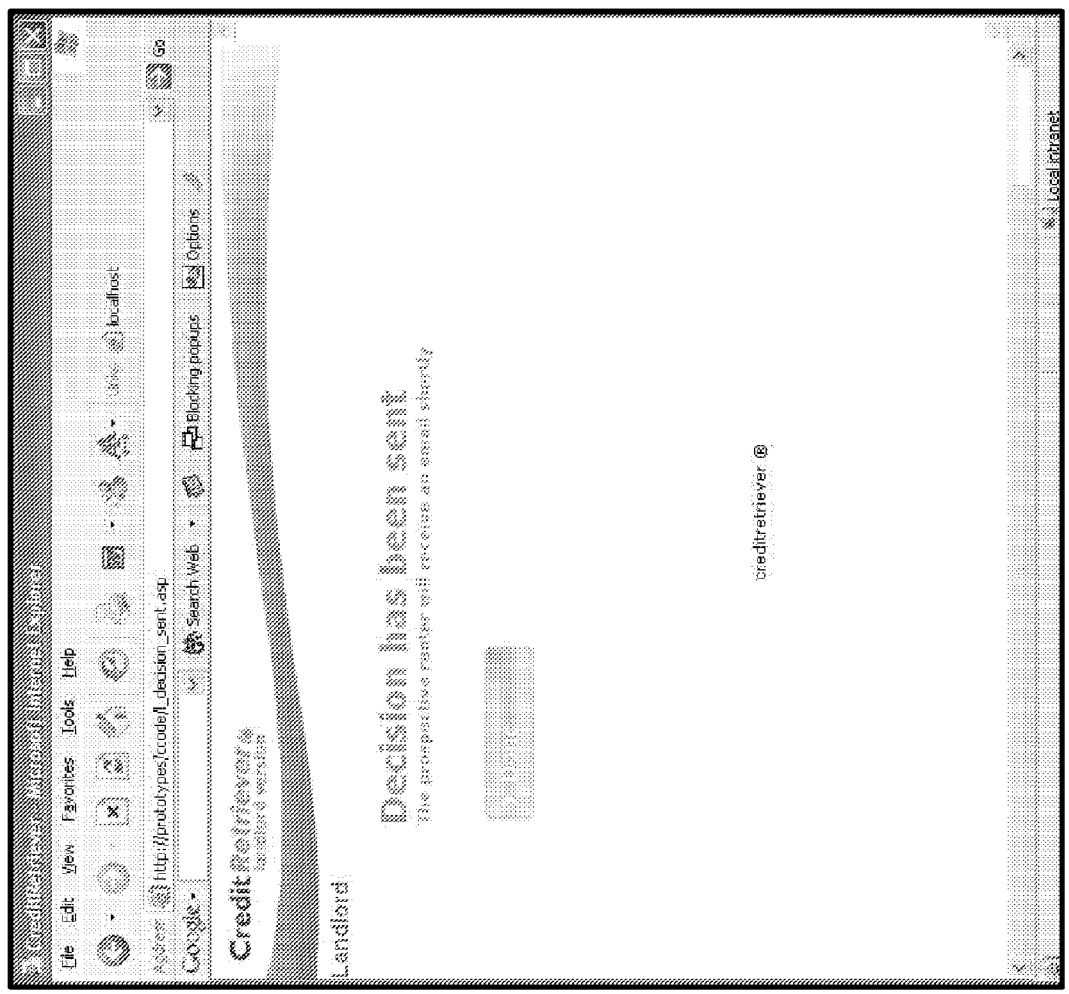
FIG. 22 illustrates a screenshot indicating communication by a screener to the applicant of an application decision in an exemplary applicant screening system.

The screener may select whether to view the screening result reports in decision operation 1526. Report viewing is performed in display operation 1528. Otherwise, or after report viewing, the screener enters a decision in decision operation 1530, and the decision is sent to the applicant in transmission operation 1532 (e.g., by email). See the confirmation screenshot 2200 in FIG. 22.

Figure 26:
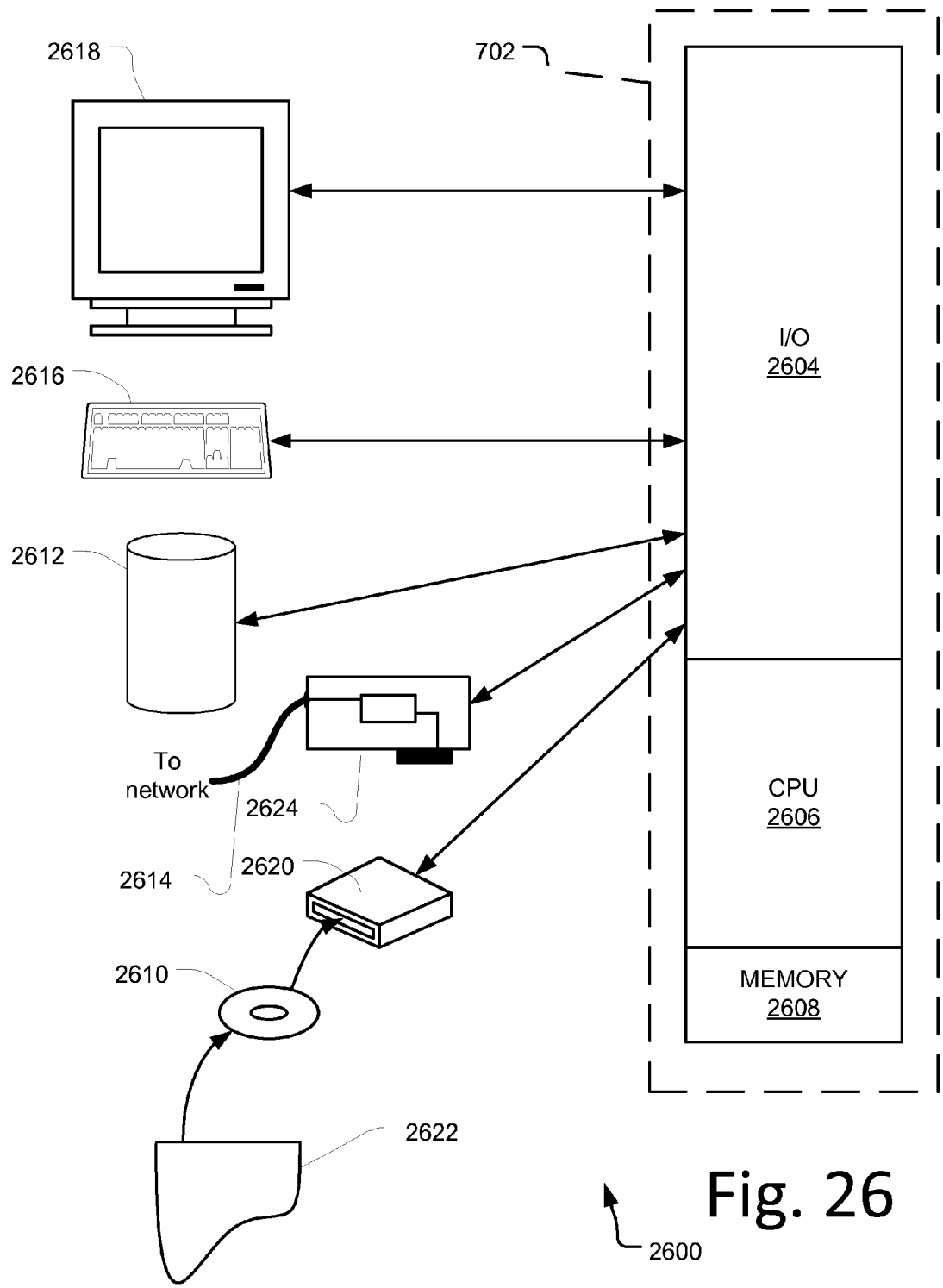
FIG. 26 illustrates an exemplary system useful in implementations of the described technology.

FIG. 26 illustrates an exemplary system useful in implementations of the described technology. A general purpose computer system 2600 is capable of executing a computer program product to execute a computer process. Data and program files may be input to the computer system 2600, which reads the files and executes the programs therein. Some of the elements of a general purpose computer system 2600 are shown in FIG. 26 wherein a processor 2602 is shown having an input/output (I/O) section 2604, a Central Processing Unit (CPU) 2606, and a memory section 2608. There may be one or more processors 2602, such that the processor 2602 of the computer system 2600 comprises a single central-processing unit 2606, or a plurality of processing units, commonly referred to as a parallel processing environment. The computer system 2600 may be a conventional computer, a distributed computer, or any other type of computer. The described technology is optionally implemented in software devices loaded in memory 2608, stored on a configured DVD/CD-ROM 2610 or storage unit 2612, and/or communicated via a wired or wireless network link 2614 on a carrier signal, thereby transforming the computer system 2600 in FIG. 26 to a special purpose machine for implementing the described operations.

The I/O section 2604 is connected to one or more user-interface devices (e.g., a keyboard 2616 and a display unit 2618), a disk storage unit 2612, and a disk drive unit 2620. Generally, in contemporary systems, the disk drive unit 2620 is a DVD/CD-ROM drive unit capable of reading the DVD/CD-ROM medium 2610, which typically contains programs and data 2622. Computer program products containing mechanisms to effectuate the systems and methods in accordance with the described technology may reside in the memory section 2604, on a disk storage unit 2612, or on the DVD/CD-ROM medium 2610 of such a system 2600. Alternatively, a disk drive unit 2620 may be replaced or supplemented by a floppy drive unit, a tape drive unit, or other storage medium drive unit. The network adapter 2624 is capable of connecting the computer system to a network via the network link 2614, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 2600 is connected (by wired connection or wirelessly) to a local network through the network interface or adapter 2624, which is one type of communications device. When used in a WAN-networking environment, the computer system 2600 typically includes a modem, a network adapter, or any other type of communications device for establishing communications over the wide area network. In a networked environment, program modules depicted relative to the computer system 2600 or portions thereof, may be stored in a remote memory storage device. It is appreciated that the network connections shown are exemplary and other means of and communications devices for establishing a communications link between the computers may be used.

In an exemplary implementation, screening kiosk software modules, screener client software modules, screening server software modules, and other modules may be incorporated as part of the operating system, application programs, or other program modules. Screening results, personal identification codes, account information, property information, decision data, and other data may be stored as program data.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method, comprising:
   receiving by a screening service, an applicant profile that identifies an applicant;
   generating, by the screening service, the screening results of the applicant based on the applicant profile;
   generating, using a processor, an identifier and associating the identifier with the screening results of the applicant;
   receiving an authorization from the applicant to communicate the screening results to a screener;
   in response to the authorization from the applicant, sending a notification to the screener with the identifier, wherein the screening results of the applicant can be retrieved using the identifier;
   receiving an input from the screener with the identifier; and
   providing the screening results of the applicant to the screener in response to the input from the screener.

2. The method of claim 1, wherein the notification is an email communication.

3. The method of claim 1, wherein authenticating the identity of the applicant further comprises authenticating the identity of the applicant by the screening server.

4. The method of claim 1, further comprising generating an applicant account with a login identification and a password, wherein the login identification and the password are used to authenticate the applicant.

5. The method of claim 1, further comprising receiving a selection of screening services from the applicant.

6. The method of claim 5, wherein generating the screening results of the applicant further comprises generating the screening results of the applicant based on the selection of screening services.

7. The method of claim 1, further comprising generating an applicant notification to the applicant, the applicant notification notifying the applicant of availability of the screening results.

8. The method of claim 7, wherein the applicant notification is an email notification.

9. The method of claim 7, wherein the applicant notification invites the applicant to log into an applicant account to view the screening results.

10. A non-transitory computer-readable storage medium having computer-executable instructions comprising:
    receiving by a screening service, an applicant profile that identifies the applicant;
    generating, by the screening service, the screening results of the applicant based on the applicant profile;
    generating an identifier and associating the identifier with the screening results of the applicant;
    receiving an authorization from the applicant to communicate the screening results to the screener;
    in response to the authorization from the applicant, sending a notification to the screener with the identifier, wherein the screening results of the applicant can be retrieved using the identifier;
    receiving an input from the screener with the identifier; and
    providing the screening results of the applicant to the screener in response to the input from the screener.

11. The non-transitory computer-readable storage medium of claim 10, wherein the notification is an email communication.

12. The non-transitory computer-readable storage medium of claim 10, wherein the computer-executable instructions further comprising receiving a selection of screening services from the applicant.

13. The non-transitory computer-readable storage medium of claim 10, wherein the computer-executable instructions further comprising generating an email notification to the applicant, the email notification notifying the applicant of availability of the screening results.

14. The non-transitory computer-readable storage medium of claim 13, wherein the email notification invites the applicant to log into an applicant account to view the screening results.

15. The non-transitory computer-readable storage medium of claim 13, wherein the computer-executable instructions further comprising generating an applicant account with a login identification and password, wherein the login identification and the password are used to authenticate the applicant.

16. A method comprising:
    receiving by a screening service, an applicant profile that identifies an applicant;
    generating, by the screening service, the screening results of the applicant based on the applicant profile;
    generating, using a computer, an identifier and associating the identifier with the screening results of the applicant;
    receiving an authorization from the applicant to communicate the screening results to the screener;
    in response to the authorization from the applicant, sending a notification to the screener with the identifier, wherein the screening results of the applicant can be retrieved using the identifier;
    receiving an input from the screener with the identifier; and
    providing the screening results of the applicant to the screener in response to the input from the screener.

17. The method of claim 16, further comprising authenticating an identity of the applicant.

18. The method of claim 16, further comprising:
    receiving the applicant's email address from the screener; and
    in response to receiving the applicant's email address from the screener, inviting the applicant to provide the applicant profile.

19. The method of claim 18, further comprising receiving a selection of screening service from the screener.

20. The method of claim 19, further comprising generating the screening results of the applicant based on the selection of screening services.

* * * * *